United States Patent [19]

Boyd

[11] 4,100,603
[45] Jul. 11, 1978

[54] FEET, INCHES AND SIXTEENTHS ADDER

[75] Inventor: John Oliver Boyd, Houston, Tex.

[73] Assignee: Joseph Lyndon Boyd, Houston, Tex.

[21] Appl. No.: 751,448

[22] Filed: Dec. 16, 1976

[51] Int. Cl.² .............................................. G06F 7/50
[52] U.S. Cl. ................................................. 364/771
[58] Field of Search .............. 235/169, 170, 168, 156, 235/152; 364/771, 772, 709

[56] References Cited

U.S. PATENT DOCUMENTS

| | | | |
|---|---|---|---|
| 3,739,161 | 6/1973 | Gross et al. ........................... | 235/156 |
| 3,973,113 | 8/1976 | Goldsamt ............................. | 235/156 |
| 3,976,867 | 8/1976 | Campbell ............................. | 235/169 |
| 4,010,359 | 3/1977 | Weber et al. ........................ | 235/169 |

OTHER PUBLICATIONS

R. Townsend, "Serial Digital Adders for a Variable Radix of Notation", *Electronic Engineering*, pp. 410–416 Oct. '53.

*Primary Examiner*—David H. Malzahn
*Attorney, Agent, or Firm*—Murray Robinson; Ned L. Conley; David Alan Rose

[57] ABSTRACT

An electronic adding machine for adding and subtracting feet, inches, and sixteenths inch has a hexadecimal keyboard with the decimal keys 0-9 contrasting with the six other keys 10-15. Each addend and subtrahend applied to the keyboard is encoded in binary coded hexadecimal (sixteenths and inches) and decimal (feet) and temporarily stored in receiver registers.

Whatever data is in the receiver registers is continually read out by an L.E.D. display. Read out is effected by first converting the inch and sixteenths data to binary coded decimal and thereafter converting all the data from BCD to seven segment L.E.D. signals. Timed blanking of the L.E.D.s saves battery power.

Accumulator registers store the total of all previous entries. When an add or subtract key is actuated, a hexadecimal full adder adds the augend in the accumulator registers and the data in the receiver registers, the result is entered in the accumulator registers, and the receiver registers are cleared to receive more data. If the data component is other than sixteenths, e.g. inches or feet, a correction is made to the result before entering it in the accumulator registers, since the feet are counted in decimal and the inches in duodecimal, and are so stored in the accumulator registers even though binary coded.

23 Claims, 25 Drawing Figures

POWER SUPPLY

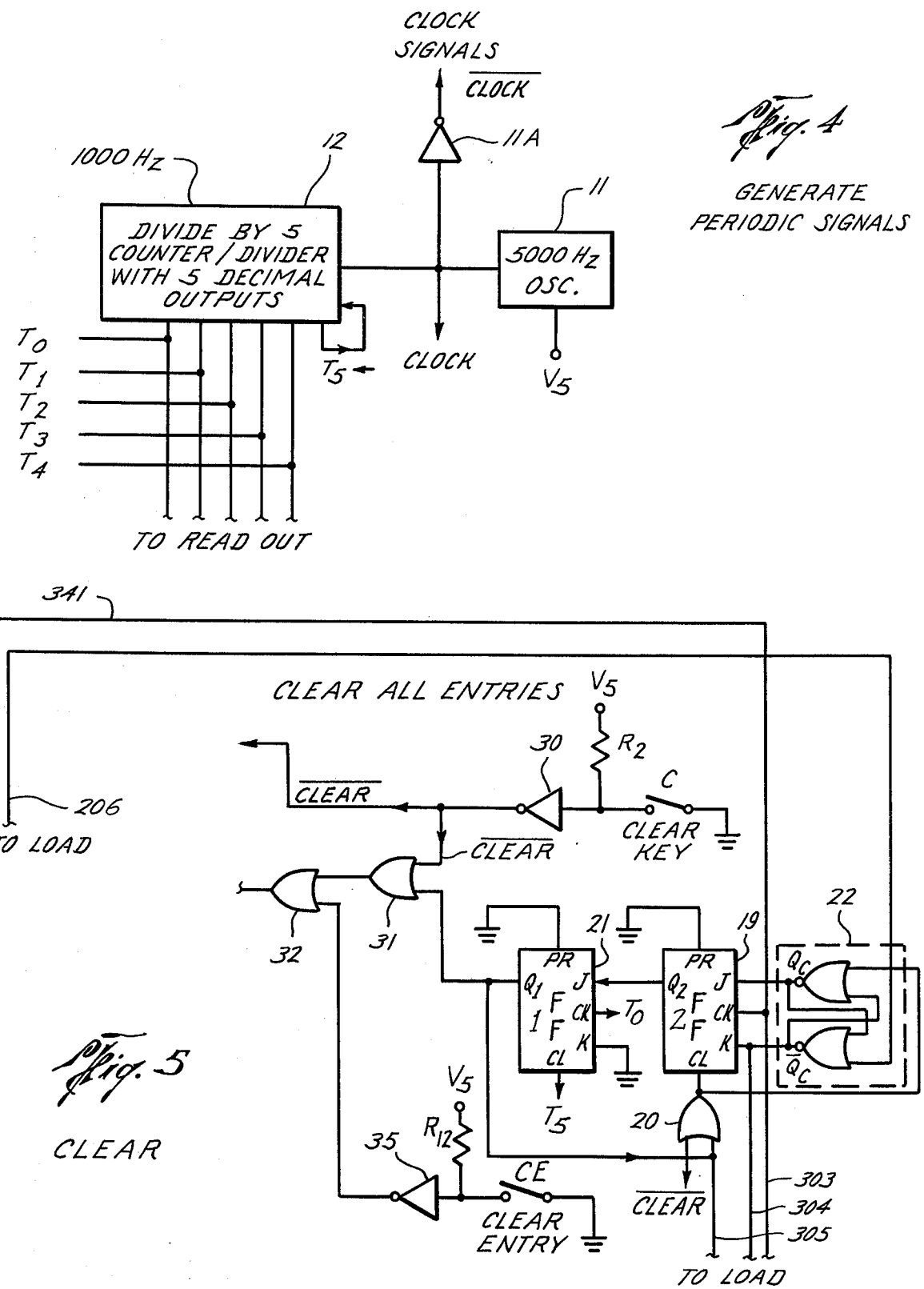

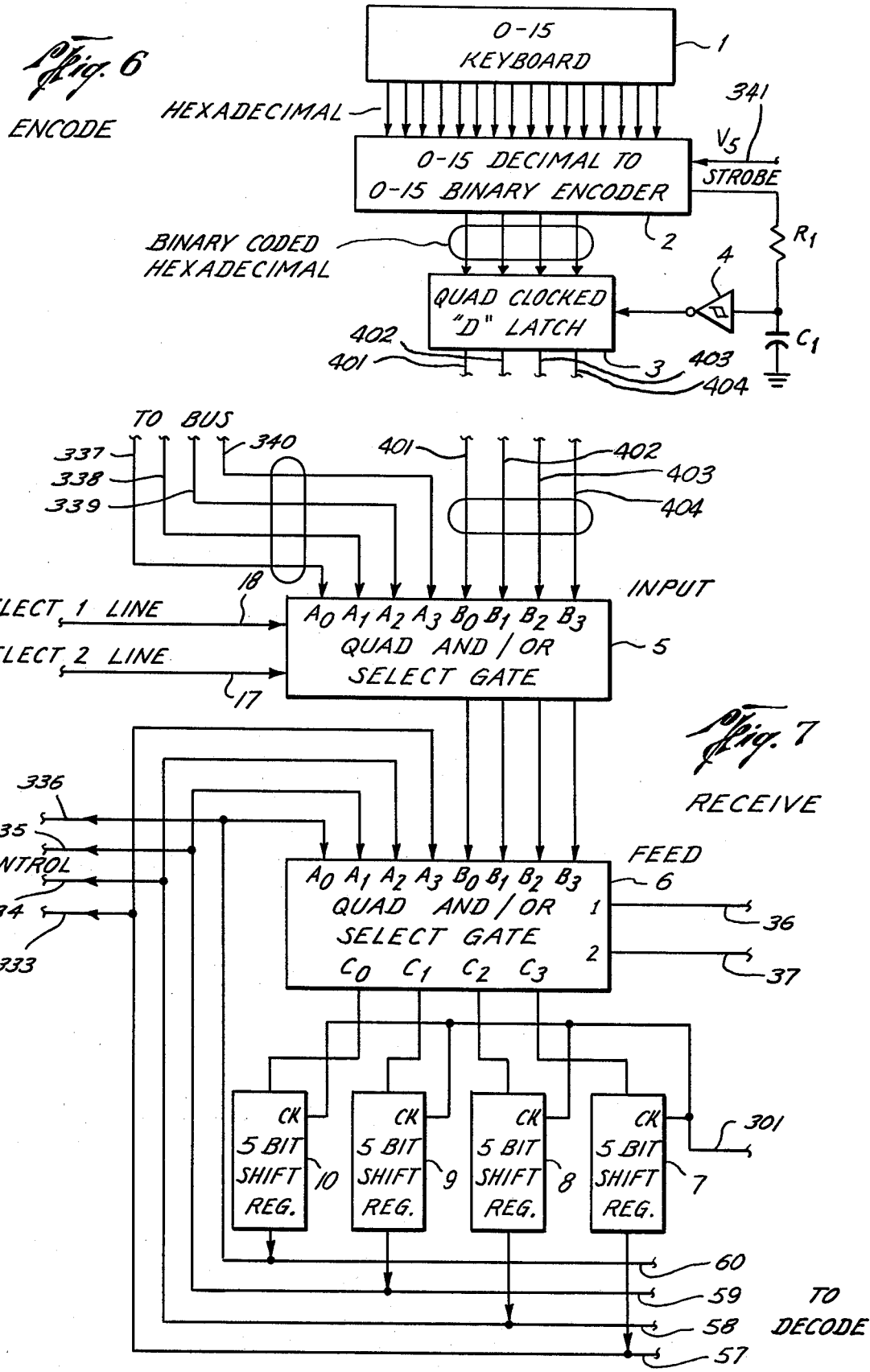

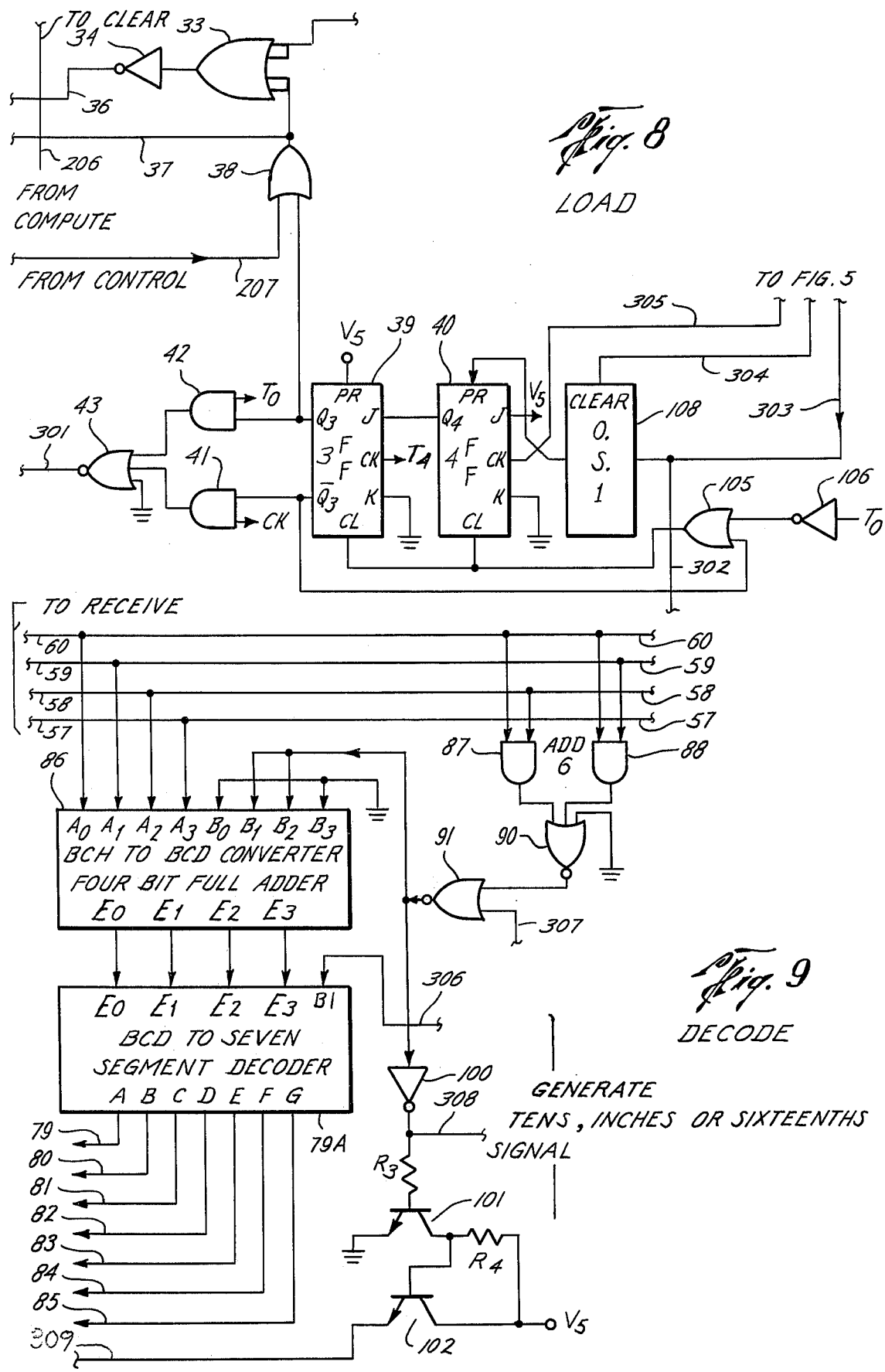

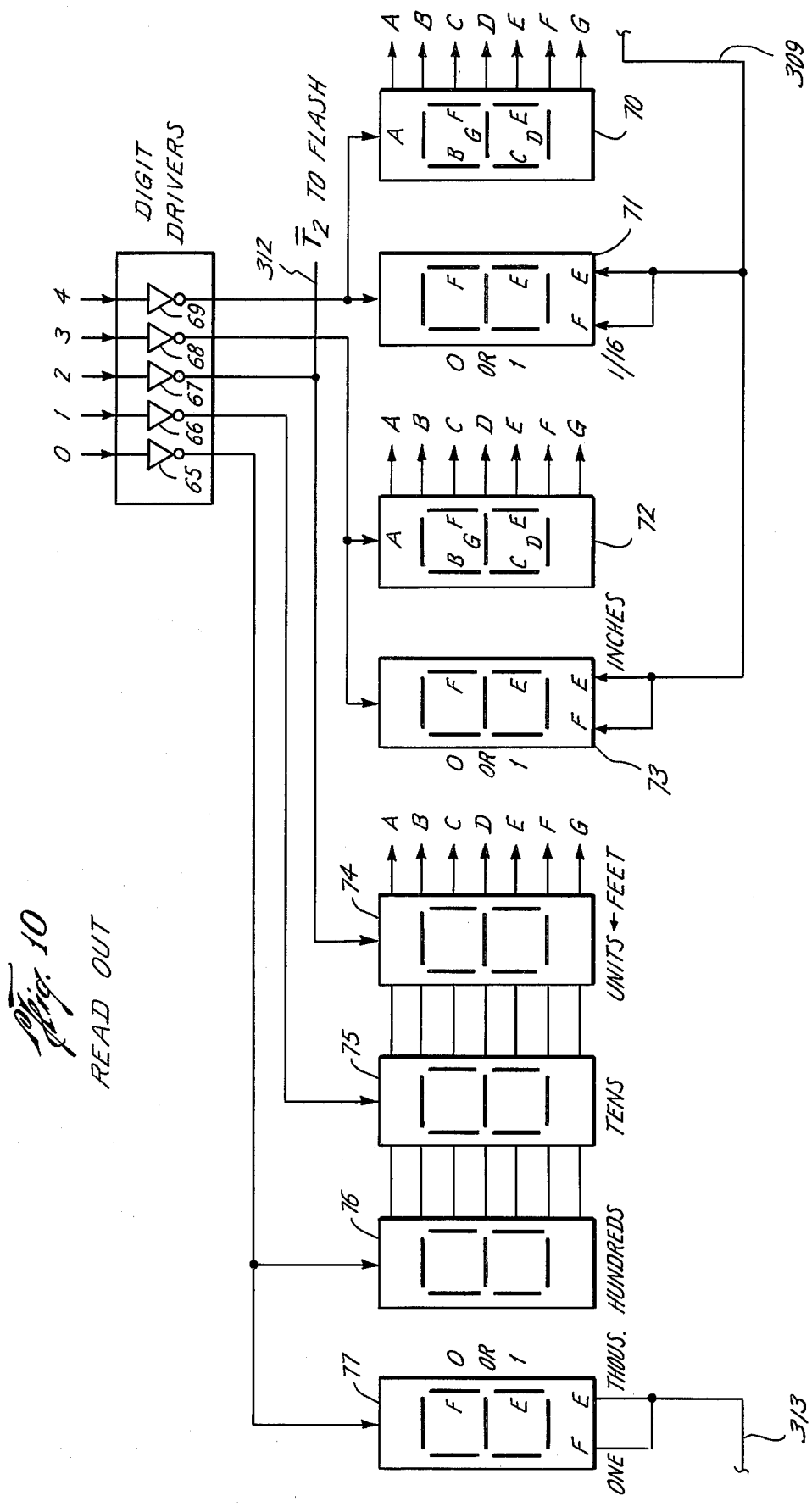

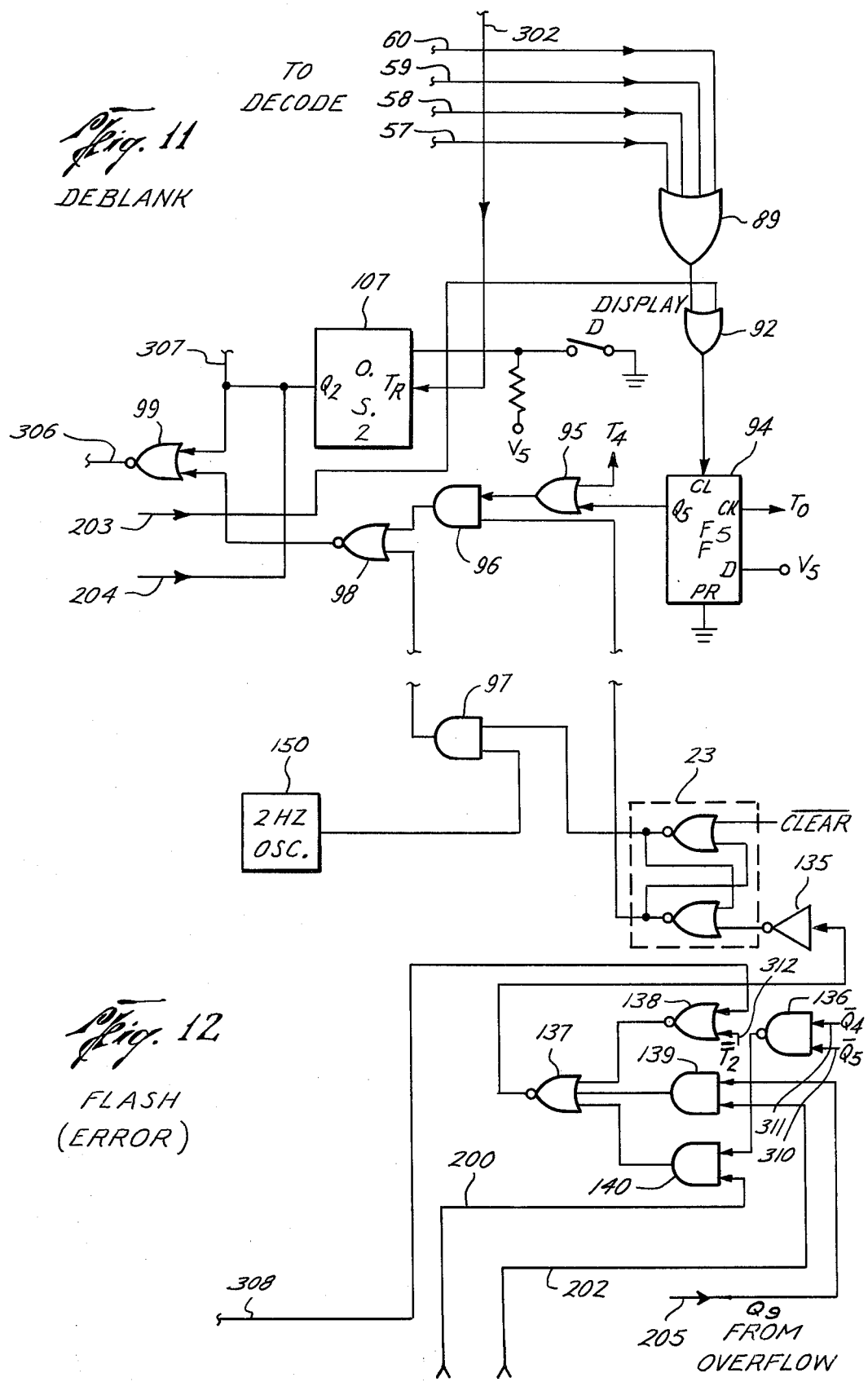
Fig. 11 DEBLANK
Fig. 12 FLASH (ERROR)

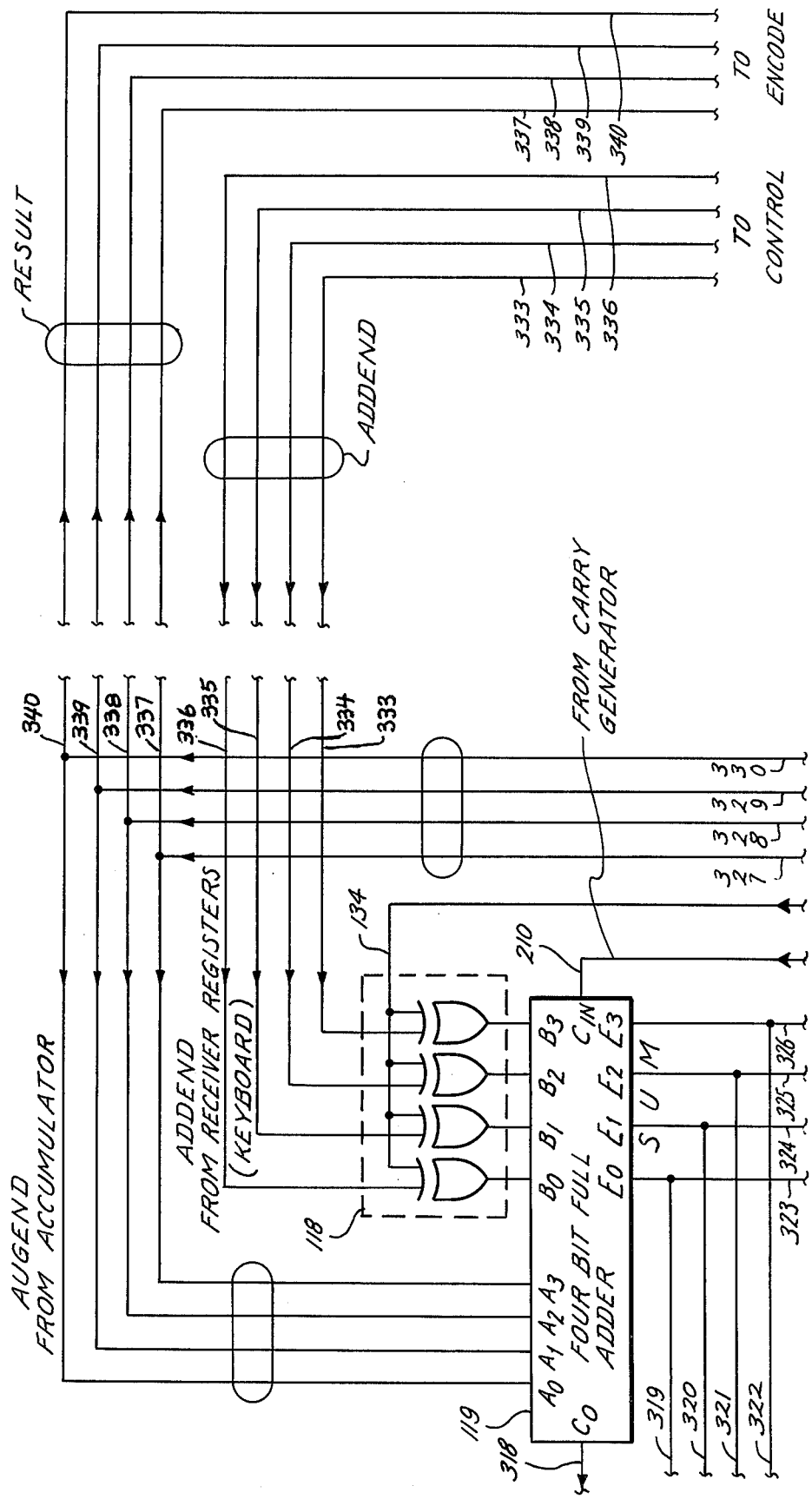

CORRECT

ACCUMULATE

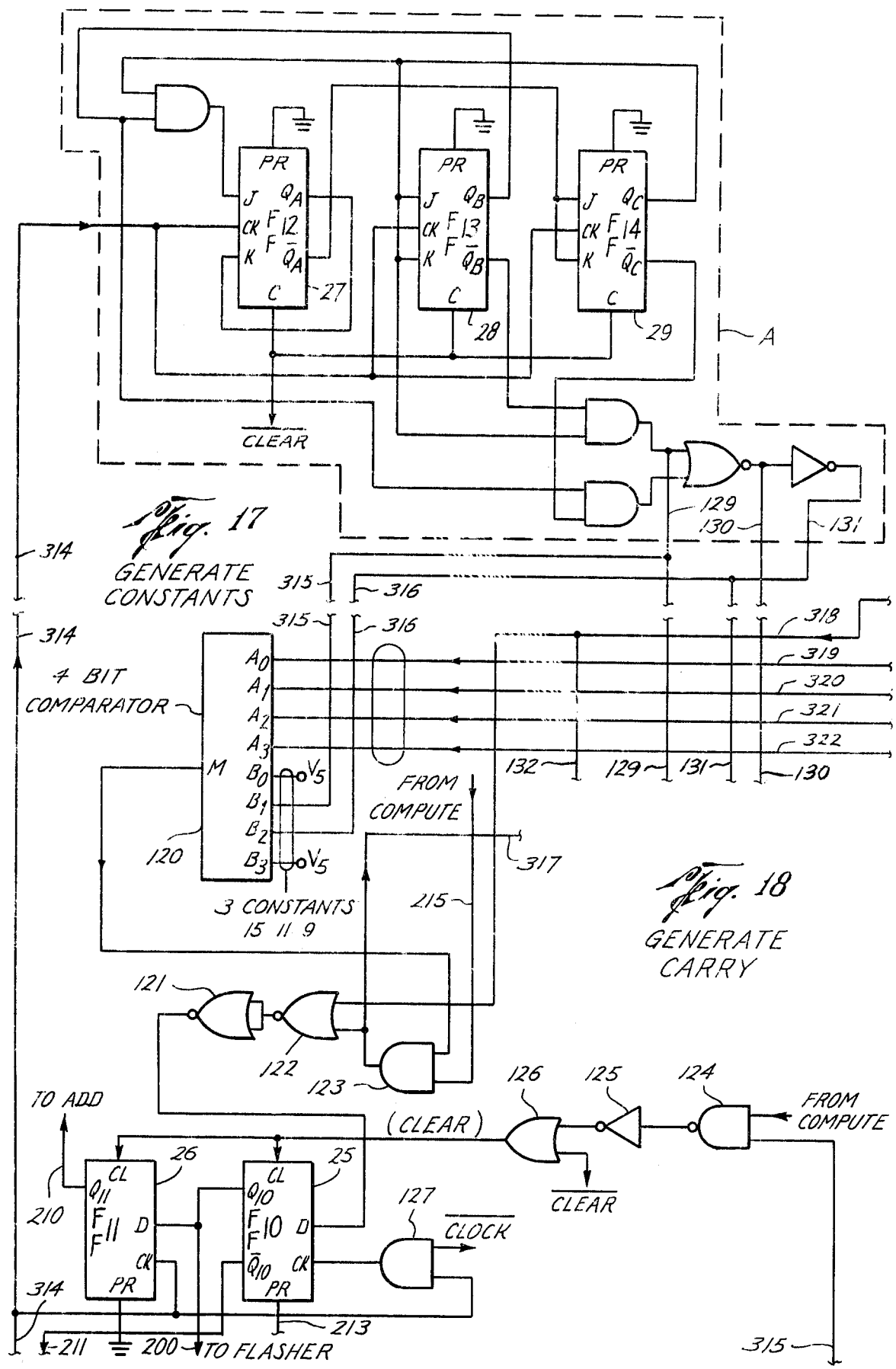
Fig. 17 GENERATE CONSTANTS
Fig. 18 GENERATE CARRY

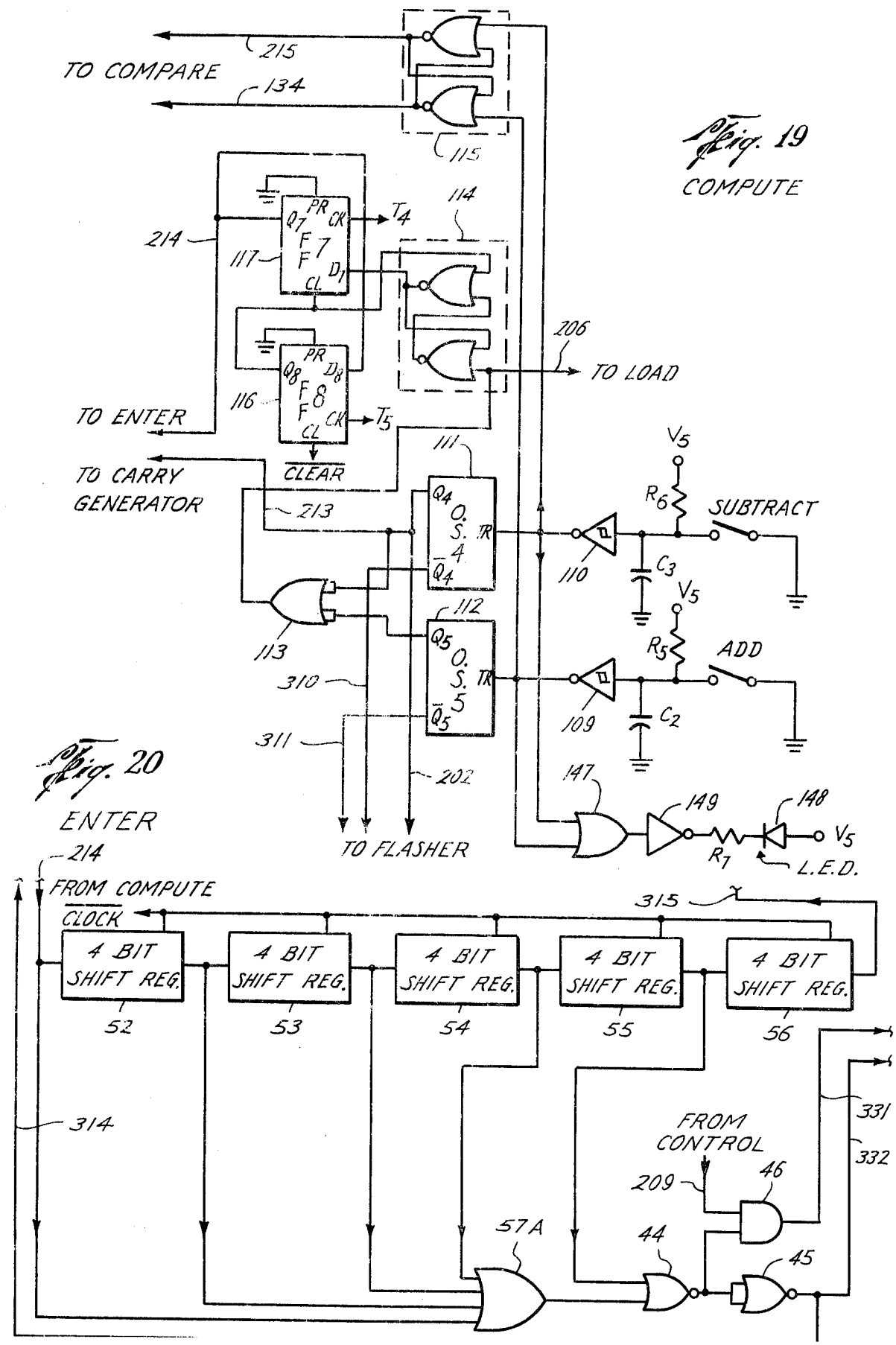

CONTROL

GENERATE OVERFLOW SIGNAL

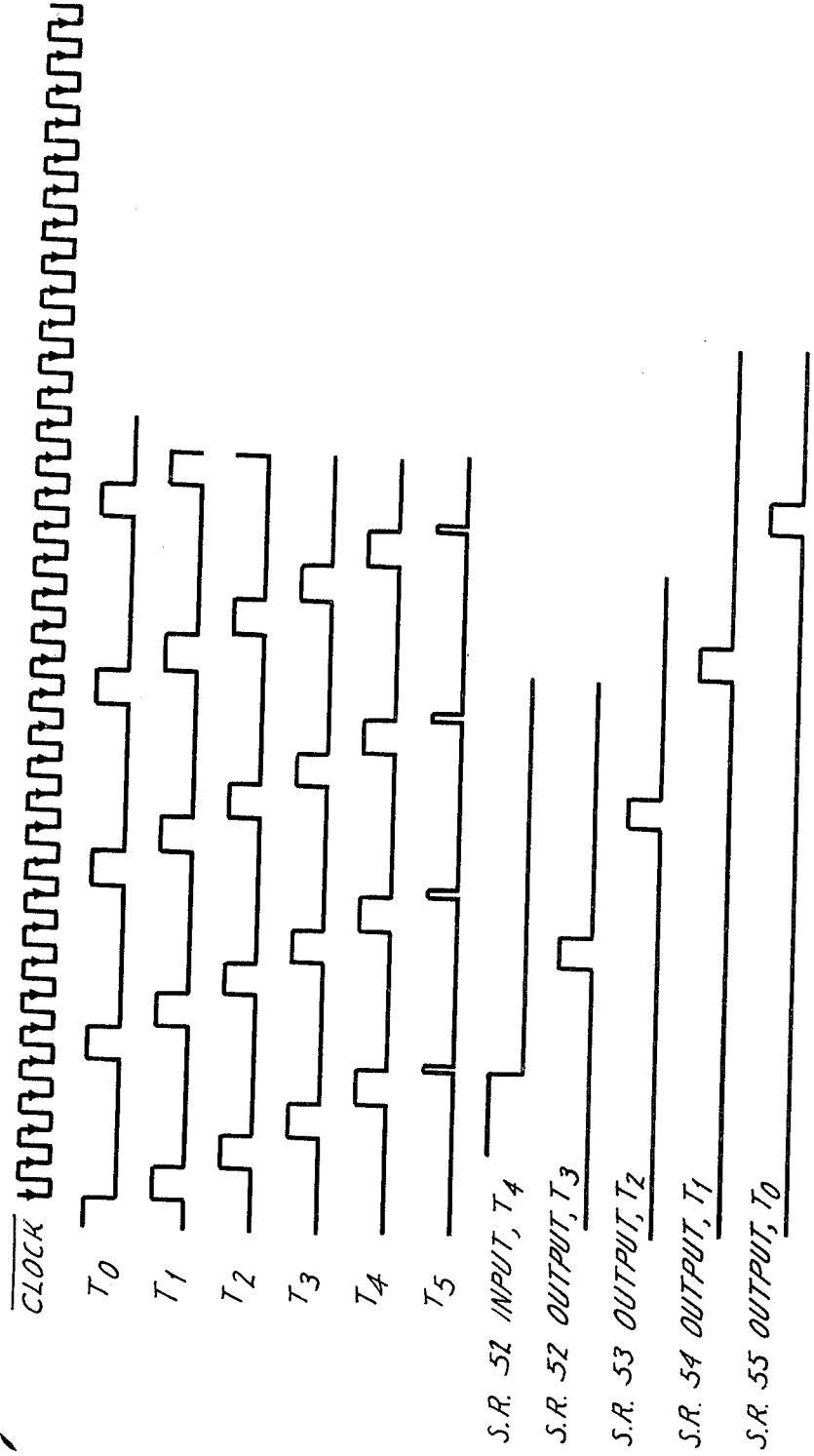

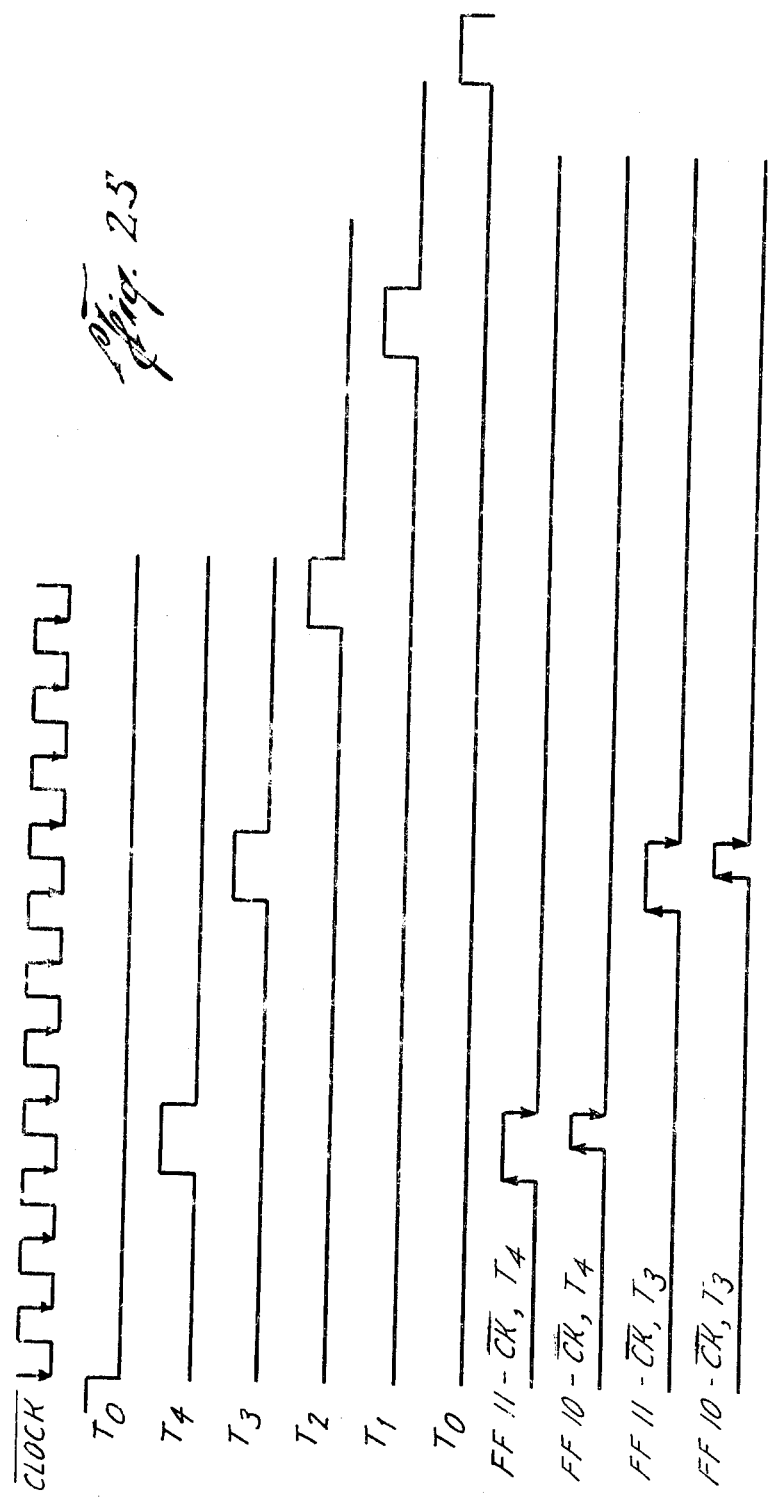

FEET, INCHES AND SIXTEENTHS ADDER

BACKGROUND OF THE INVENTION

This invention relates to special purpose computers and more particularly to an electronic digital computer for adding and subtracting compound denominate numbers, specifically lengths denoted by feet, inches, and sixteenths of an inch.

According to The World Book Encyclopedia, copyright 1961, volume 4, page 120, a denominate number is a "number with a name". Further, it is said that "many denominate numbers contain irregular subdivisions", and "a denominate number which contains two or more irregular subdivisions is called a compound denominate number". "Such compounds are more difficult to add, subtract, multiply, or divide, because the subdivisions must first be changed or reduced to the same denomination or unit of measure before these operations are performed".

It is an object of the present invention to provide a specific computer for directly adding and subtracting compound denominate numbers, more particularly denominate numbers comprising feet, inches, and sixteenths of an inch, without the necessity of first converting same to a common unit of measure. Other objects and advantages of the invention will appear from the following description thereof.

Applicant is aware of an apparatus which is believed to have appeared on the market subsequent to his invention which provides for the addition of numbers including common fractions of any selected denominator. This is to be distinguished from the present invention in that it does not handle fractions of fractions and requires the actuation of denominator as well as numerator keys, and requires use of plural numerator keys for numerators in excess of nine, there being only numeral keys 0-9 on the keyboard.

SUMMARY OF THE INVENTION

According to the invention a hexadecimal keyboard is employed whereby only a single numeral is required to represent sixteenths of an inch. Similarly, only a single numeral is required to represent inches. By this construction, a dimension requiring $n$ digits for representation in the decimal system requires only ($n$-2) numerals to represent it in the computer. For example, to write the denominate number 999 feet 11 inches 15 sixteenths, requires seven digits if the number is written in the decimal system, but only five numerals are required when the sixteenths are counted in hexadecimal, the inches are counted in duodecimal, and only the feet are counted in decimal.

The numbers entered with the hexadecimal keyboard are encoded to binary coded hexadecimal. They are added in a full adder adapted for hexadecimal, i.e. a carry is generated when the sum exceeds 15. This is correct for adding the sixteenths but since inches and feet are also to be added, the sum from the main adder is sent to a comparator and a carry is generated whenever the sum exceeds 9, 11 or 15 according to whether feet, inches, or sixteenths are being added. Aslo the sum is sent to a correction adder which adds a constant to generate the proper units.

The sum produced by the adder and the correction adder is still binary coded and the sixteenths are still in hexadecimal and the inches in duodecimal, so that only $n-2$ four bit bytes are required to represent the $n$ digit number. When a final total has been reached by adding and subtracting the desired group of numbers, the sum is decoded. This is accomplished by sending the total to another correction adder whereat the constant six is added if the sum exceeds nine. This converts the sum to binary coded decimal, e.g. 13 sixteenths plus six equals 19 sixteenths, equals 1 sixteenth plus 3 units, equals digit one in place two and digit 3 in place one, equals 13. Or 12 inches plus six equals 18 sixteenths, equals 1 sixteenth plus 2 units, equals 12. The binary coded decimal is then converted to seven segment L.E.D. signals and fed to a plurality of L.E.D.s for read out.

Other features of the invention are the color coded keyboard wherein keys 0-9 are white and keys 10-15, the added keys for hexadecimal, are coded black. This facilitates proper use of the keyboard, the black keys being used only for inches and sixteenths. Aslo, an error indication system flashes the L.E.D.s on and off at a rate discernible to the eye to signal an erroneous entry, such as use of the black keys for feet or entry of data when the total has already reached one thousand.

Further features of the invention are the power saving periodic excitation of the L.E.D.s at a frequency higher than detectable by the eye, and an automatic power cut off when the device has not been used for a specified period of time, e.g. 2 minutes, and a special key to override the time delay power cut off without disturbing previous entries.

In addition, the invention provides not only a clear entry key to wipe out all data stored in the apparatus but a clear last entry key to enable the operator to remove the last entry without destroying all the previously stored data.

Further aspects of the invention will appear hereinafter.

BRIEF DESCRIPTION OF THE DRAWINGS

For a detailed description of a preferred embodiment of the invention reference will be made to the accompanying drawings wherein:

FIGS. 3-22 are fragments of the electric circuit diagram of the apparatus, to be assembled in accordance with FIG. 2; and FIGS. 23-25 are graphs of voltage versus time at various locations in the electric circuit of the apparatus.

DESCRIPTION OF A PREFERRED EMBODIMENT:

I. Mechanical Structure and Operation — FIG. 1

Figure 1:
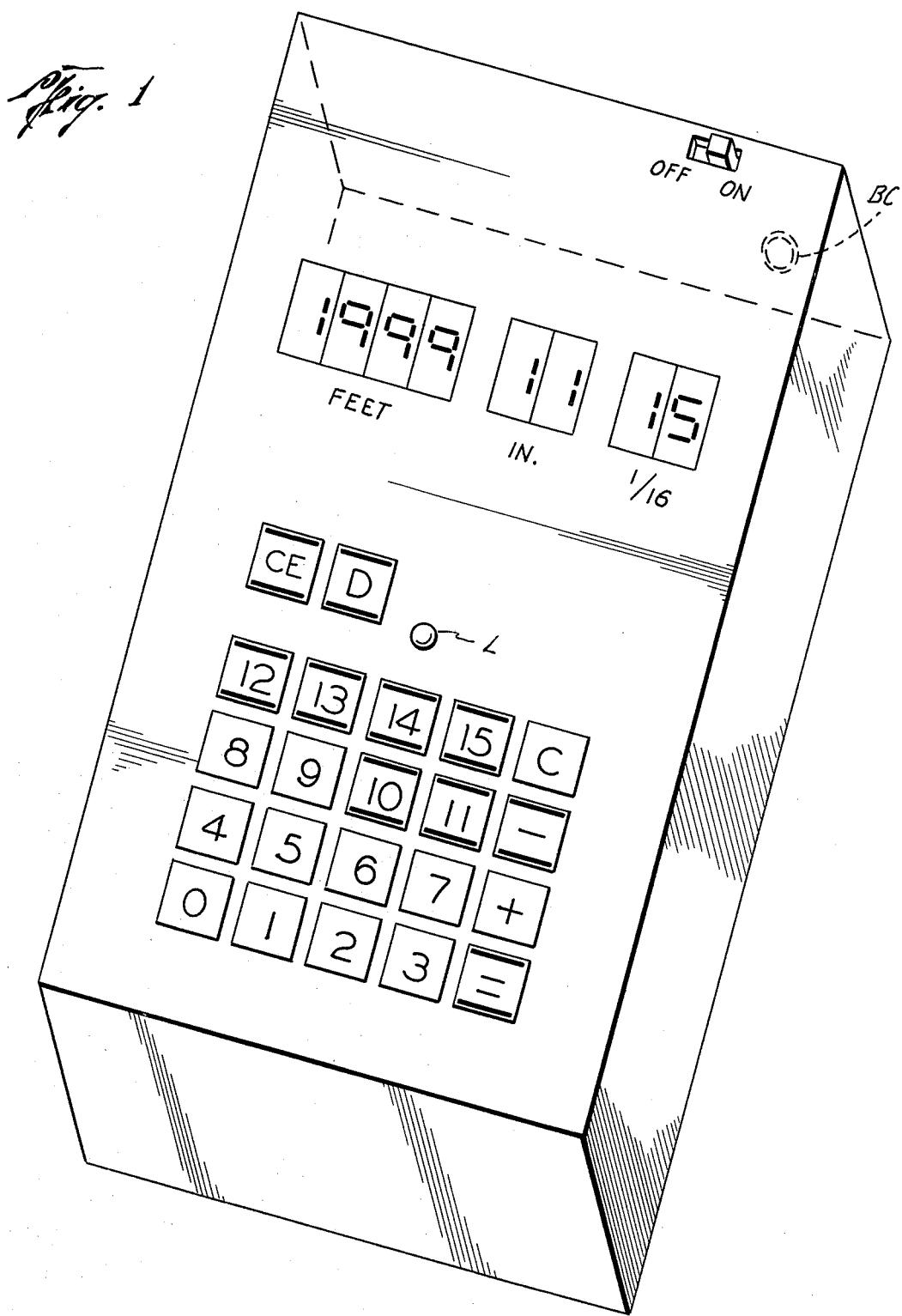
FIG. 1 is a pictorial view of an apparatus embodying the invention.
Figure 2:
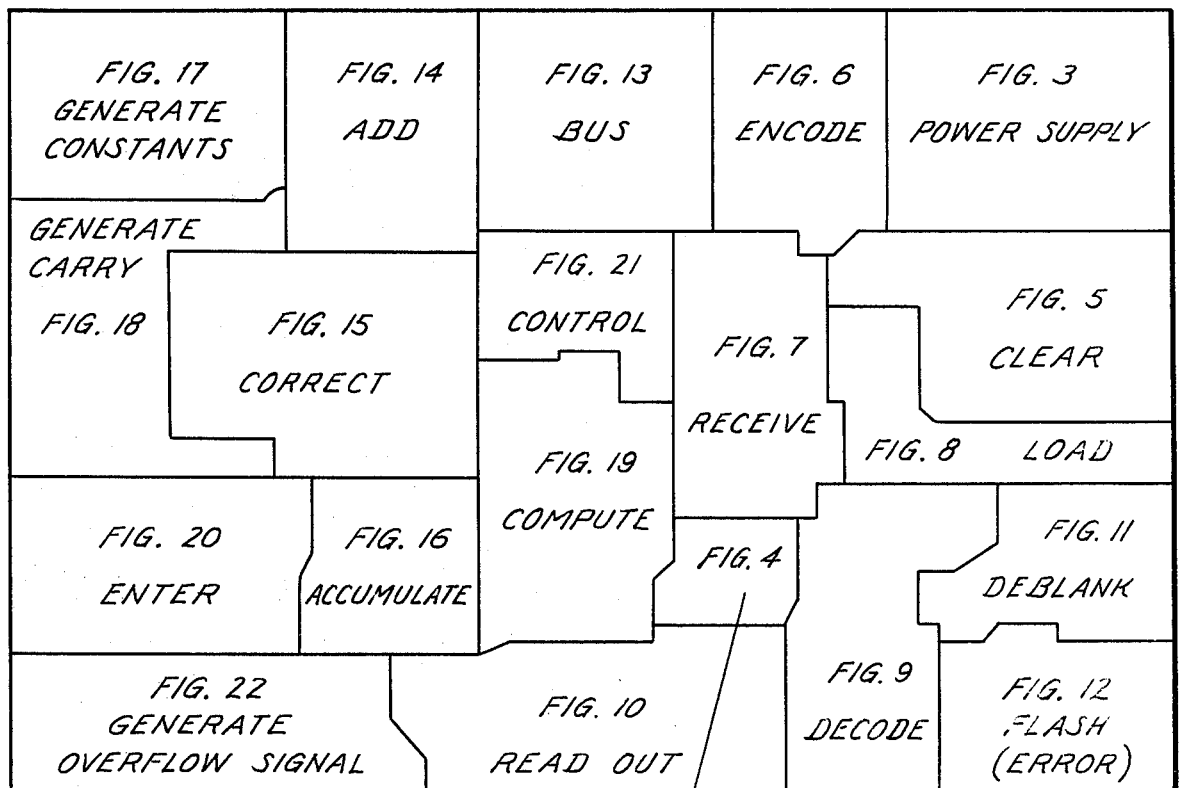
FIG. 2 is a mosaic diagram illustrating the manner of assembly of FIGS. 3 through 22 to make a complete electric current diagram for the apparatus.

Referring now to FIG. 1, there is shown an apparatus embodying the invention, including a box whose dimensions are as indicated on the drawing, adapted to be held in the hand during use. The apparatus is an electronic, digital adding machine. It has a hexadecimal keyboard and an L.E.D. display. The latter has three banks of windows reading in feet, inches, and sixteenths. The keyboard includes 16 numerical (0-15) keys, together with add (+), subtract (−), compute (equals), clear (C), delete last entry (DE) and display (D) keys. There is an on-off switch, a battery charging socket (BC), and an indicator light (L) which shines whenever an add or subtract key is punched. A time delay switch (see infra)

turns off the display a predetermined time (e.g. 2 minutes) after non-use, but is overridden by entry of further data; overrride may also be effected by depressing the display key (D), at which time the last previously stored data is displayed and the previous information in the registers is retained.

Up to 1999 feet, 11 inches, 15/16 inch can be totaled, in the disclosed embodiment.

To operate the device:
(a) Punch keys 0–9 to indicate number of feet (up to 999). This will initially register over in the sixteenths and inches part of the display.
(b) Punch keys 0–11 to indicate number of inches (up to 11). This will move previous entry of feet over to the left and the inches will appear in sixteenths part of diaplay.
(c) Punch keys 0–15 to indicate number of sixteenths (up to 15). This moves previous entries of feet and inches to proper part of display and causes the sixteenths to appear in proper part of the display. If a black key has been used to enter feet, the display will flash on and off to indicate error when, in step (c), the feet component tries to move over to the feet part of the display.
(d) Punch + key. If same dimension is to be added several times, punch + key as many times as that dimension is to be included in total; there is no need to repeat entry of dimension.

Then repeat above for other dimensions to be added. Or if it is to be subtracted punch "−" key.

Repeat for all dimensions to be added or subtracted.

Punch CE key if it is desired to delete a dimension that has been punched in but neither the + or − key has yet been punched.

Punch "=" key to get total.

Punch C key to clear and start over.

If improper data is fed to the adder, e.g. if, as aforementioned, a black key is used to enter feet or if data is entered when a total of one thousand feet has already been reached, the display flashes on and off and must be cleared to start over.

II. Overview of Electrical System

Actuation of the numerical keys of the keyboard generates binary coded hexadecimal signals which are loaded into receiver registers. To display the data in the register it is converted to binary coded decimal by a full adder and an add six generator actuated when the number exceeds nine. The binary coded decimal signals are fed through a converter to produce seven segment L.E.D. signals. The seven signals light up the L.E.D. read out periodically whenever a timed display circuit so commands, at an on-off frequency high enough to appear continuous to the eye.

Whenever a dimension has been fully loaded into the receiver registers, actuation of one of the arithmetic keys (+ or −)sends the data in the receiver registers through an arithmetic unit to accumulator registers. Actuation of the result key (=) sends the data in the accumulator registers to the receiver registers and the result appears at the L.E.D. readout.

The arithmetic unit adds binary coded hexadecimal, which is suitable for adding sixteenths, and includes means to correct the output when the dimension component is other than hexadecimal, i.e. when adding feet (which is decimal) or inches (which is duodecimal). Subtraction is effected by complementing.

III. General Description of Electrical System (a) Power Supply — FIG. 3

Figure 3:
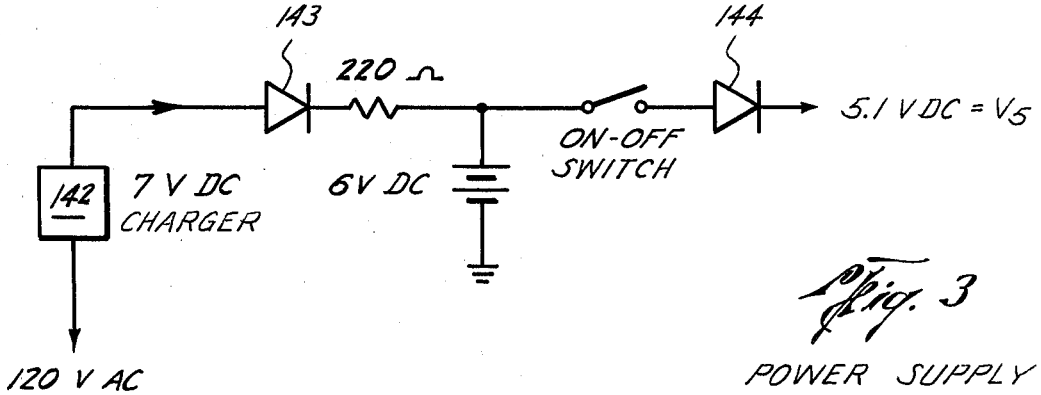

When the on-off switch is closed, the power supply, shown in FIG. 3 provides direct current at 5.1 volts to the various parts of the electrical system at the terminals marked $V_5$, and also to the other parts of the electrical system for which such a power supply is conventional.

(b) Timing — FIG. 4

Energization of the power supply activates the timer shown in FIG. 4. The timer includes a 5000 Hz. oscillator 11 which supplies clock pulses via the line marked "clock" to all of the terminals of the electrical system so marked. As shown in the timing chart, FIG. 23, the clock pulses are rectangular configuration, alternating between positive and zero at 5000 Hz.

The output of oscillator 11 also is fed to inverter 11A, which supplies inverted clock pulses to all of the terminals of the electrical system marked "clock" (bar clock). As seen from the timing chart, the bar clock pulses are of the same frequency, amplitude and wave form as the clock pulses, but are one-half cycle out of phase therewith.

Additionally, the oscillator 11 feeds into a divide by five counter 12. Counter 12 has six output lines labeled $T_0$, $T_1$, $T_2$, $T_3$, $T_4$, $T_5$ which are connected to similarly marked terminals throughout the system. The shape, duration and frequency of the pulses appearing on the output lines of the divide by five counter are shown on the timing chart. It will be seen that all the pulses $T_0$ through $T_5$ have a 1000 Hz. frequency, that pulses $T_0$ through $T_4$ are time contiguous successive positive pulses each having a duration equal to one clock cycle, and that pulses $T_5$ are short positive pulses or spikes occurring between $T_4$ and $T_0$ times.

The timing charts also show the duration of positive and zero potentials at various terminals of various components of the electrical system, namely at terminals $Q_1$, $Q_2$, $Q_3$, $Q_4$ of the bistable circuits or "flip-flops" of like flip-flop serial number (as distinct from part number), on the output of monostable multivibrator or "one-shot" O.S.1, on the various R/S latches in reset condition, on the four-bit shift registers 52–56 (S.R.'s 52–56) under the indicated conditions, and at flip-flops FF10 and FF11 under the indicated conditions.

(c) Clear — FIG. 5

Referring now to FIG. 5, before starting to compute one first clears the electrical system by depressing the clear key C. This closes a switch to supply power to inverter 30 which supplies bar clear pulses to all the terminals of the electrical system marked "—clear" and also to And gate 31. By this means the random data in the system is destroyed and all components are positioned ready to receive new data.

(d) Encode — FIG. 6

Referring to FIG. 6, depression of one of the numerical keys (0–15) on keyboard 1 causes encoder 2 to generate a binary coded hexadecimal signal composed of four pulses of positive or zero voltage which appear on the four parallel output lines from the encoder. The encoder output is fed to a quad latch 3.

(e) Register — FIG. 7

Referring to FIG. 7 the output of latch 3 goes into the four line "B" input ($B_0$, $B_1$, $B_2$, $B_3$) of input select gate 5.

Figure 16:
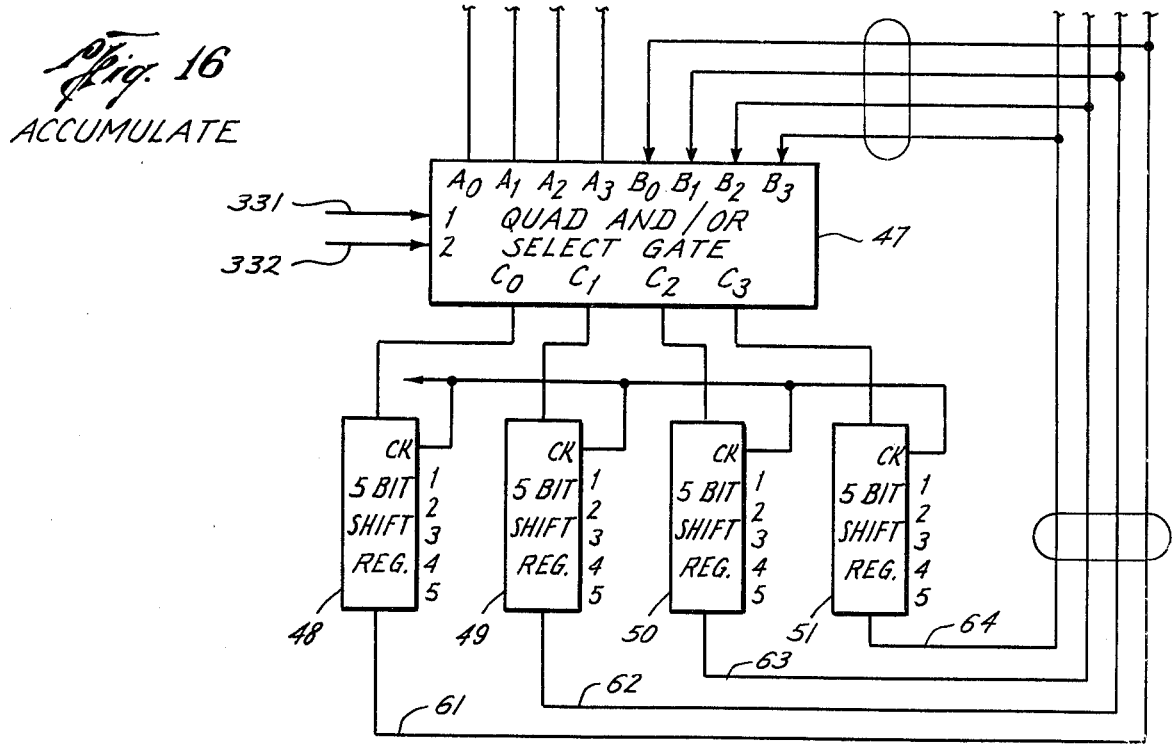

Input select gate 5 passes to its output either the data on its B input, which receives the new data entries, or the data on its A input, which comes from the accumulator registers 48–51 (FIG. 16). In the following we are considering gate 5 to be set to pass the data on its B input and exclude data on its A input. From gate 5 the binary signal is sent to the B input of feed select gate 6.

Feed select gate 6 passes to its output either the new data on its B input or old data recirculated to its A input from receiver registers 7–10. At this time we are considering gate 6 to be set to pass the data on its B input and to exclude data on its A input. From gate 6 the signal goes to receiver registers 7–10.

(f) Load — FIG. 8

Feed select gate 6 is then shifted to its A input by the loading means shown in FIG. 8 until a new signal is received and in the meantime the data in the receiver registers merely circulates, shifting at each clock pulse generated by clock 11.

When another numerical key or keyboard 1 is depressed, another binary coded hexadecimal signal is sent to feed gate 6. The feed gate B input is enabled by the load means of FIG. 8 and the new data byte is loaded into the next section of the registers. Loading is always initiated by a $T_4$ pulse and each time new data is loaded into the registers it is shifted one position so that the next data will not fall on top of the data last loaded in.

(g) Decode — FIG. 9

Referring to FIG. 9, the binary coded hexadecimal signals from the display registers 7–10 continually feed into the A input lines of added 86. In addition, the output of the receiver registers feeds into an add six generator, comprising gates 87–91 and grounded terminals $B_0$, $B_3$ of adder 86. The add six generator supplies a binary six signal to the B input of the full adder 86 whenever the output from the receiver registers 7–10 exceeds nine. The add six generator at the same time generates a tens signal which is delivered to inverter 100. In this manner the binary coded hexadecimal and duodecimal from the display register is converted to decimal, with the units still binary coded and appearing at the E outputs of adder 86 and the tens appearing as a single pulse at inverter 100.

The binary coded decimal units output of adder 86 is fed to binary coded decimal to seven segment decoder 79A at its E input terminals.

(h) Read Out — FIG. 10

Referring to FIG. 10, the seven outputs A–G from decoder 79A are fed to the like lettered inputs of light emitting diodes (L.E.D.s) 70, 72 and 74–76, which are in parallel, to activate appropriate segments thereof to portray arabic numerals corresponding to the decimal inputs to decoder 79A. The output of inverter 100, through transistors 101, 102, (FIG. 9), feeds L.E.D.s 71, 73 (FIG. 10) to activate appropriate segments thereof to portray arabic numeral one whenever the add six generator indicates that the number from display registers 7–10 is over nine. L.E.D. 77 is activated to portray an arabic numeral one whenever it receives a signal from the thousands overflow signal generator shown in FIG. 22, which occurs if the number entered on the keyboard 1 added to the number already in the accumulator registers totals one thousand or more.

Although L.E.D.s 70, 72, 74–76 are always all connected to the outputs A–G of the decoder, and L.E.D.s 71, 73 are always both connected to the tens signal output from the add six generator, and L.E.D. 77 is always connected to the thousands overflow signal generator, the several L.E.D.s are powered only when receiving a pulse from one of the digit drivers 65–69 (FIG. 10) which are fed with timing pulses $T_0 - T_4$ respectively. The timing is such that the several L.E.D.s are powered only when the appropriate data is being fed to the decoder from the receiver registers, thereby avoiding the need for having a separate decoder for each L.E.D. In this manner L.E.D.s 70–77 respectively display one thousand, hundreds, and units feet, tens and units inches, and tens and units sixteenths of an inch. The frequency with which the several L.E.D.s are powered being 1000 Hz., they appear to be lit continuously even though each receives a new signal from the decoder one thousand times each second. However, power is saved by such strobing since each L.E.D. is actually receiving power only one fifth of the time. In addition, there is avoided the need for having a separate decoder for each L.E.D. as would be required if each were lit continuously.

(i) Deblank — FIG. 11

Signals from the receiver registers 7–10 are also fed to Or gate 89 of the deblanking circuit shown in FIG. 11. As the data in the receiver registers circulates with each clock pulse, the first non-zero signals cause the deblanking circuit to produce a high output from its Nor gate 99 and this high output appears on the B.I. input of decoder 79A. Until that time, the decoder has a zero output and the L.E.D.s are dark. This avoids a read-out with leading zeros.

If the data in the registers is all zero, a $T_4$ pulse to Or gate 95 of the deblanking circuit will also cause the latter to have a high output, so that the sixteenths L.E.D. will light up to show zero.

In order for Nor gate 99 to have a positive or deblanking output, not only must there be non-zero data at the output of the receiver registers but in addition there must have been a recent use of one of the numerical keys or the D (Display) key in order to activate one-shot or monostable multivibrator O.S.2 107 of the blanking circuit. O.S.2 is set to stay flipped for about two minutes after activation, and in such state produces the low output required to be fed to Nor gate 99 in order for the latter to send a high output to decoder 79A. If the adder is not used for over two minutes, the L.E.D. display goes out, thereby saving the battery. The display will light up again with the same read out if display key D is actuated. Or if additional data is entered the display will light up again with a new readout.

(j) Flash — FIG. 12

When entering data, the hexadecimal keys 10–15 should not be used for entering feet. Also, if the entries to the adder total as much as one thousand, no further entries should be made, since the adder's capacity might be exceeded upon the next entry. If either type of entry is attempted, Nor R/S Latch 23 of the flasher circuit of FIG. 12 will be activated to cause the L.E.D.s 72–77 to flash off and on at the frequency of oscillator 150. Both latch 23 and oscillator 150 feed And gate 97, which in turn feeds Nor gate 98 of the deblanking circuit through which such flashing is effected.

(k) Bus — FIG. 13

After a dimension has been entered via the keyboard 1 into the receiver registers 7–11, the load circuit of FIG. 8 causes the feed select gate 6 of the receiver portion of the circuit (FIG. 7) to be shifted to receive data on its A inputs. This is data returned from receiver registers 7–10. This data circulates, moving one step at each clock pulse, and is displayed by read-out L.E.D.s as just explained.

In addition, the receiver register data, which is four bit, binary coded hexadecimal, duodecimal, and decimal, is sent via the Addend lines of FIG. 13 to inverter 118 (FIG. 14), feeding the B input of main adder 210.

(1) Add — FIG. 14.

Main full adder 119 adds in hexadecimal. It receives its augend on its input terminals A and adds thereto the addend on its B input terminals from inverter 118, the latter normally being deactivated so as to pass uninverted signals. The result appears on the E terminals of the adder.

Figure 15:
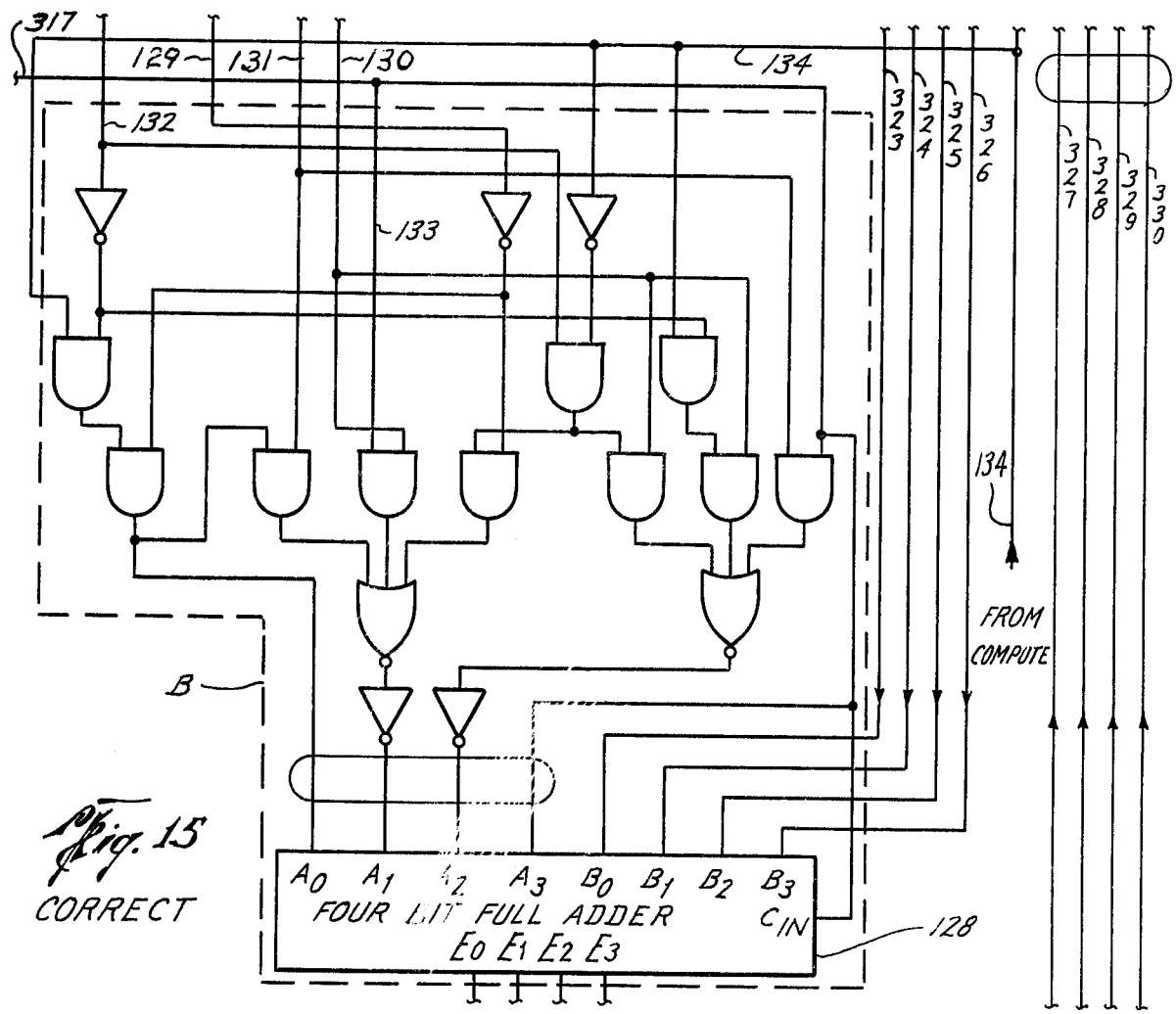

(m) Correct – FIG. 15

The result from the E terminals of the hexadecimal adder is fed to the B input terminals of correction full adder 128 (FIG. 15). Suitable constants are fed to the A input terminals of correction full hexadecimal adder 128 (FIG. 15). Suitable constants are fed to the A input terminals of correction full hexadecimal adder 128 to provide a corrected result on its E terminals. The correction is required when non-hexadecimal numbers are added in the main adder, i.e., feet and inches. No correction is made or required when sixteenths have been added by the main adder.

(n) Accumulate — FIG. 16

The corrected result at the E terminals of correction adder 128 is fed to the A input of accumulator select gate 47. Gate 47 chooses between its A input and its B input, the latter being a feedback from accumulator registers 48–51. Assuming the A input is enabled, the corrected result is passed to output terminals E of gate 47 and thence to the accumulator registers 48—51.

If the B input of accumulator select gate 47 is enabled, data in the accumulator registers is shifted at each clock pulse and circulates through the gate. The date circulating is the corrected result, still in binary coded hexadecimal, duodecimal, and decimal.

Data from the accumulator registers 48-51 is the augend which is fed to the A terminals of the main adder 119 as above mentioned. This same augend data is sent by the augend lines of FIG. 13 (Bus) to the A terminals of receiver input select gate 5 (FIG. 7). When gate 5 is shifted to pass the signals on its A input, same is sent through feed select gate 6 to the receiver registers 7–10 and is read out by the L.E.D. display as the total.

In travelling from receiver registers 7–10 through the arithmetic components of the circuit, i.e. through FIGS. 13 (Bus), 14 (add), 15 (Correct), and 16 (Accumulate), and thence back to the receiver registers, various ancillary inputs are provided and gates shifted as will next be described.

(o) Generate Constants — FIG. 17

A circuit for generating different binary constants at different times is shown within the broken line border at A in FIG. 17. These constants appear on lines 129, 130, 131, from whence they are fed to the logic elements of the correction circuit of FIG. 17, ultimately appearing at the A input of the correction full adder 128 (FIG. 14).

The carry output $C_0$ from the main adder 119 is also fed to the logic component of the correction circuit via line 132. A further carry signal from comparator 120 of the carry generating circuit of FIG. 18 (see infra) is fed to the logic component via line 133, which also is fed to the $A_3$ input terminal of the correction adder and to its carry input $C_0$.

(p) Generate Carry — FIG. 18

The output from terminals E of main adder 119 is also fed to the A input terminals of comparator 120 of the carry generation circuit shown in FIG. 18. Here the adder output is compared with various constants 15, 11 or 9, applied at various times to the B input terminals of the comparator from the constants generator A of FIG. 17 in conjunction with highs from the power supply at terminals $B_0$ and $B_3$. If the result from the main adder exceeds 9 or 11 for feet or inches a carry signal is generated and fed through And gate 123 to Or gate 122. If sixteenths were being added, the result on the E output of the main adder will not exceed 15 so there is no output from the comparator, but any carry generated by the full adder 119 will appear at the $C_0$ terminal of the main adder 119 and that too is fed to Nor gate 122 of the carry generator circuit.

Any carry signal from Nor gate 122 is passed through Nor gate 121 and held by flip flops FF10, 11 25 26 for transmittal to the $C_{in}$ terminal of the main adder for use at the next addition.

Carry signals from comparator 120 are also fed to line 133 of the logic component of the correction circuit (FIG. 15) when passed by And gate 123.

(q) Compute—FIG. 19

To initiate various data transfers and other operations described above, one of the arithmetic keys (+) or (−) of the compute circuit shown in FIG. 19 is actuated.

If either of the arithmetic keys is actuated, L.E.D 148 (FIG. 20) is lit momentarily to provide a visual aid in counting the number of repeated entries of the same addend or subtrahend effected by repeated actuation of the selected arithmetic key.

Actuation of an arithmetic key controls the position of compute latch 115. One of the outputs of latch 115 is fed via line 134 to inverter 118 of the add circuit of FIG. 14, setting it to invert for substraction and not to invert if addition is to be performed. This same signal is also sent via line 134 to the logic component of the correction circuit of FIG. 15, telling it how to perform for addition or subtraction.

Another output from compute latch 114 is sent via line 215 to And gate of the generate carry circuit of FIG. 18, enabling it to perform.

The arithmetic keys are also connected via one shot multivibrators O.S. 4, 5 (111), (112), and Or gate 113 to compute latch 114 and, via line 206, to the clear circuit of FIG. 5. Compute latch 114 (FIG. 19) working through flip-flops FF7, 8 (117), (116) sends control signals via line 214 to enter shift register 52 and Or gate 57A to control accumulator select gate 47. The signal from line 206 to the clear circuit of FIG. 5 provides that the receiver shift registers 7–10 automatically will be cleared before a new dimension is entered.

(r) Enter—FIG. 20

Control signals from line 124 of the compute circuit (FIG. 19) are fed to the input of 4 bit shift register 52 of the enter circuit shown in FIG. 20. Register 52, the first of a group of five enter registers 52–56, is connected to the bar clock output of the periodic signal generator circuit of FIG. 4. With this arrangement, a high on line 214 originally appearing at $T_4$ on the input to enter register 52 when an arithmetic key is actuated appears at the output of enter register 52 at $T_3$, at the output of register 53 at $T_2$, at the output of register 54 at $T_1$, and at the output of register 55 at $T_0$, and at the output of 56 at the next $T_4$. Between these appearances there are lows at all the input and output terminals of the enter registers 52–56. At each of these appearances, a signal is sent by the Or gates logic components of the enter circuit of FIG. 20 to accumulator select gate 47 (FIG. 16) to enable its A input terminals to receive new data; otherwise the gate's B input terminals are enabled to receive data circulated back from the accumulator registers 48–51. It will be noted that the appearances are in the reverse timing sequence, $T_4$, $T_3$, $T_2$, $T_1$, $T_0$, so that registers 52–55 provide means to generate pulses in reverse timing sequences. This is needed so that addition can be performed starting with the least significant dimension element (sixteenths) although data is entered on the keyboard feet first. Register 56 similarly generates a later pulse to clear the carry generator flip-flops FF10, 11 (25), (26), in the case of subtraction, prior to the next operation. If a thousands carry is generated in addition, it is not to be cleared since the apparatus is at capacity.

Figure 21:
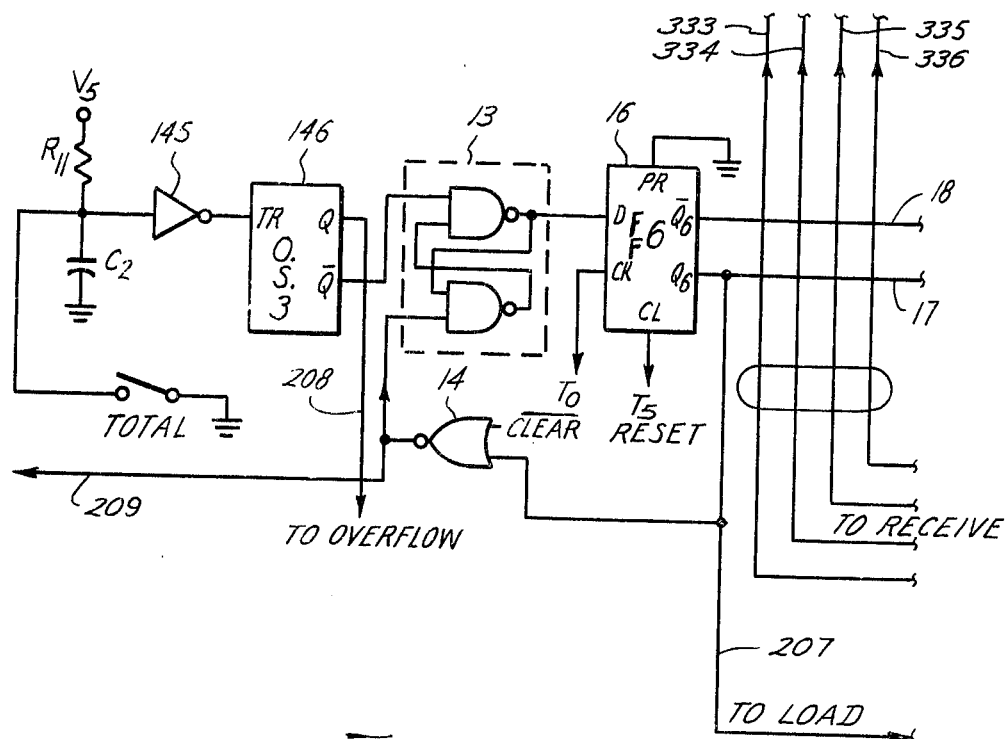

(s) Control—FIG. 21

Whenever the total key (=) of the control circuit of FIG. 21 is actuated, flip-flop FF6 16 is actuated to send signals via lines 17 and 18 to receiver input select at gate 5. Such signals shift gate 5 to enable its A input and disable its B input, thereby causing the gate to receive as an effective input binary coded hexadecimal, duodecimal, and decimal signals from the augend lines (FIG. 13) from the accumulator registers 48–51, same being passed on to the receiver registers 7–10 and read out by the L.E.D. display of FIG. 10 when suitably decoded by the circuit of FIG. 9.

Activation of the total key (=) also causes a signal to be sent from one shot multivibrator to O.S.3 (146) 146 line 208.

Figure 22:
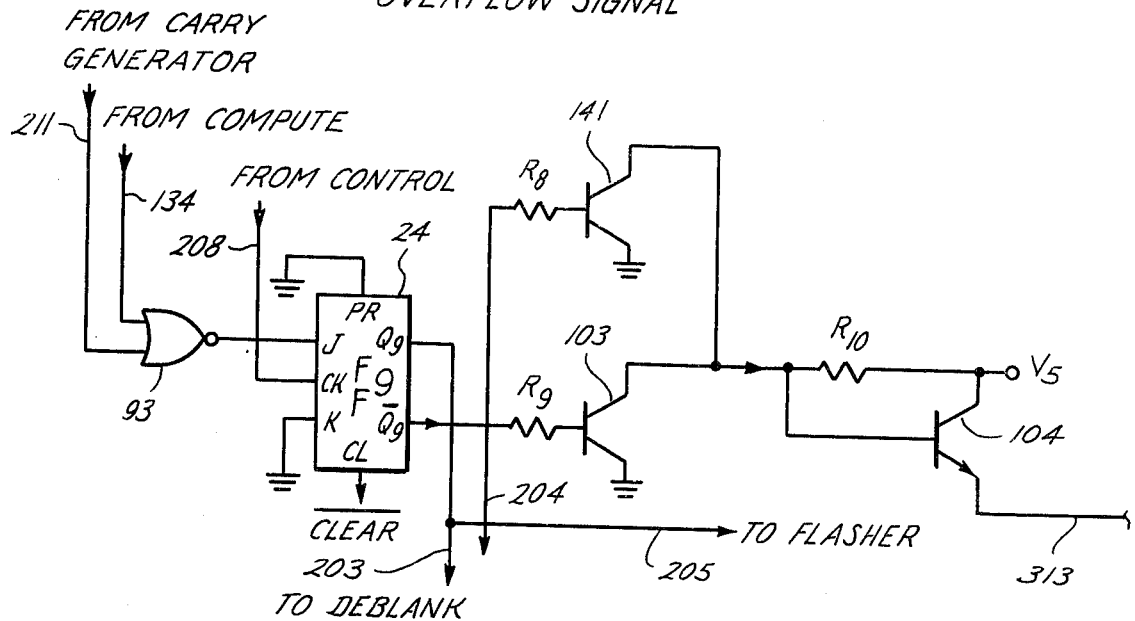

(t) Generate Overflow Signal—FIG. 22

The signal from control line 208 is sent to the generate overflow signal circuit of FIG. 22. This control signal joins with signals from the carry generator of FIG. 18 on line 211 and from the compute circuit of FIG. 19 on line 134. If a carry is generated at $T_0$ time, which time is indicated by the high at enter register 56 (FIG. 21) feeding through Nor gate 45 to And gate 127 (FIG. 20), then Or gate 93 of the overflow signal generator (FIG. 22) receives a signal. This ultimately causes a signal to appear at the output of transistor 104 which feeds the "one" segments of L.E.D. 77 of the read out (FIG. 10).

IV. Detailed Description of Electrical System

The following detailed description of the electrical system will trace out the functioning of the circuits in the normal sequence of operation.

1. APPLY POWER THRU "ON" SWITCH ON CALCULATOR
(A) All storage contains random data, and all flip-flops states are random.
(B) 5000 Hz. oscillator 11 is activated and sends clock to divide by 5 counter 12 which generates five sequential 1000 Hz. timing pulses. These pulses are normally low and go high at their appropriate pental time period. Pulses $T_0$–$T_4$ are used for timing the necessary control circuitry. An additional short pulse $T_5$ at the beginning of $T_0$ time is also provided by the counter.

2. DEPRESS CLEAR KEY

The gates, flip-flops, latches, and registers in the various sections of the circuit are prepared or cleared as follows:
(A) CONTROL LATCH
Nand R/S Latch 13 is forced to set condition thru Nor gate 14.
(B) RECEIVER INPUT GATE
At the occurrence of time interval $T_5$, control flip-flop FF6 16 is reset and its output $\overline{Q}_6$ is forced to a low condition. This low is sent to the "select 2" line 17. $\overline{Q}_6$ is now high and is sent to the "select 1" line 18. The quad And/Or input select gate 5 now has its input 1 high and input 2 low. Gate 5 is now ready to accept inputs on lines $B_0$–$B_3$.
(C) CLEAR, FLASH, ARITHMETIC, LOAD
Flip-Flop FF2 19 is cleared thru Or Gate 20 and output $Q_2$ is now low. At the next $T_5$ pulse, flip-flop FF1 21 is cleared and its $Q_1$ output is low. Nor R/S latch 22 is placed in the reset condition and the J input to flip-flop FF2 is now low; the K input is high, Nor R/S Latch 23 is also placed in the reset condition. Flip-flops 9–14 (24–29) are cleared. At the first $T_0$ pulse, flip-flops FF3 39 and FF4 40 are cleared.
(D) RECEIVER FEED GATE
Inputs to Or gate 38 are now low and input 2 to the quad and/or feed select gate 6 is low. The output of inverter 30 is high. Or gate 31 now has a high input, Or gate 32 has a high input as well as Or gate 33. The output from gate 33 is inverted by inverter 34 to a low, and input 1 to feed select gate 6 is low. The inputs $A_0$–$A_3$ and $B_0$–$B_3$ to select gate 6 are now disabled to lows. Outputs $C_0$–$C_3$ on gate 6 are low.
(E) RECEIVER REGISTERS
$\overline{Q}_3$ from flip-flop FF3 39 is now high, enabling And gate 41 and disabling And gate 42. And gate 41 receives clock pulses from 5000 Hz. Oscillator 11 and passes them to Nor gate 43 which inverts clock and drives 5-bit shift registers 7–10. The 5000 Hz. clock occurs at a high enough rate to allow 5 lows to enter the receiver shift registers 7–10 when the clear key is momentarily depressed, thereby clearing these registers.
(F) ENTER, ACCUMULATE
The input to control Nor gate 14 is clear, which is high, and the output is a low, which is fed to And gate 46, disabling this gate. The low output from 46 is connected to input 1 of quad And/Or accumulator select gate 47. The inputs to Nor gate 44 are low because the outputs from enter shift registers 52–56 are now low. This is because inverted clock has fed at least four lows through them while the clear key is depressed. Consequently the output from four input Or gate 57A is low. Nor gate 44 output is high causing Nor gate 45 output to be low. This low is fed to input 2 of accumulator select gate 47. Select gate 47 now has inputs 1 and 2 low causing its inputs $A_0$-$A_3$ and $B_0$-$B_3$ to be disabled; its outputs $C_0$-$C_3$ are now low. Accumulator shift registers 48-51, driven by the 5000 Hz. inverted clock, receive at least five low transitions when the clear button is momentarily depressed, clearing these registers.

3. RELEASE CLEAR KEY (A) Inverter 30 now has a high input which is inverted to a low. This low drives Or gate 31 to a low output. Or gate 32 also has two low inputs and its low output drives Or gate 33. Or gate 38 output is low due to $Q_3$ 39 and $Q_6$ 16 being low. These levels produce a high on input 1 of feed select gate 6 and a low on input 2 of gate 6.

A low on input 2 and a high on input 1 causes the $A_0$-$A_3$ inputs on feed select gate 6 to be enabled and lows are now being recirculated into receiver shift registers 7-10 and back to inputs $A_0$-$A_3$ via lines 57-60.

In the same manner, inputs $A_0$-$A_3$ on accumulator select gate 47 are enabled due to a high on input 1 via gate 46 and a low on input 2 via gate 45. Lows are now being recirculated into and out of accumulator shift registers 48-51 via lines 61-64.

4. L.E.D. ZERO DISPLAY CONDITION

Prior to depressing any numeral key on the keyboard, the L.E.D.s are blank, except the units sixteenths L.E.D. displays zero, as follows:

(A) TIME PULSES $T_0$-$T_4$ ACTIVATES L.E.D.'s

Divide by 5 counter 12 generates pulses $T_0$-$T_4$. These pulses are inverted by digit drivers 65-69. At the appropriate time intervals $T_0$-$T_4$, L.E.D. displays 70-78 are enabled and the information appearing on A-G, lines 79-85 from BCD-to-Seven segment decoder 79A, causes the correct segment on the proper display to light. Thousands feet information (overflow) is provided by flip-flop FF9 24. Note that $T_0$ activates hundreds feet and one thousand feet, $T_1$ activates tens feet, $T_2$ activates units feet, $T_3$ activates tens and units inches, $T_4$ activates tens and units sixteenths of an inch.

(B) $T_0$ PRODUCES $A_i + B_i = 0$ ON DECODE FULL ADDER 86

During time interval $T_0$, a low appears at the outputs of the empty receiver shift registers 7-10 on lines 57-60. These lows are sent to inputs $A_0$-$A_3$ of decode four bit full adder 86, inputs of And gates 87 and 88, and inputs of 4-input Or gate 89. The inputs to Nor gate 90 are now low, the output is high and this high forces the output of Nor gate 91 low. This low appears on inputs $B_1$ and $B_2$ of full adder 86. The binary number (0000) at $A_0$-$A_3$ is added to (0000) on $B_0$-$B_3$ to give an output of (0000) on $E_0$-$E_3$ of adder 86.

(C) ZERO OUTPUT OF FULL ADDER IS DISTRIBUTED AT $T_0$

The result $E_0$-$E_3$ of adder 86, appears on the input to binary-coded-decimal to seven segment decoder 79A.

The lows (0000) on lines 57-60 also appear on the inputs to display Or gate 89, driving its output low. The inputs to Or gate 92 are now low due to a low from 89 and a low from overflow flip-flop FF9 24. Nor gate 93 is low because the input from carry flip-flop FF10 25 is high. The resulting low output from Or gate 92 is sent to the CL input of flip-flop FF5 94. Flip-flop FF5 is a D-Flip/Flop. A clock pulse at $T_0$ causes the output, $\overline{Q}_5$ to go low since the CL input from 92 is low. The low from $\overline{Q}_5$ is sent to Or gate 95.

(D) BLANKING AT TIMES $T_0$-$T_3$

At times $T_0$, $T_1$, $T_2$, $T_3$), the output of Or gate 95 is low, provided the input $\overline{Q}_5$ from flip-flop FF5 94 is low. The output from And gate 96 is low. The output from And gate 97 is low due to the low from Nor R/S latch 23 being cleared to a low. Nor Gate 98 now has low inputs and its output is high. This high causes Nor gate 99 output to go low. This low appears on the blanking input BI of decoder 79A and the A thru G outputs of 79A are all lows causing a blank or no-light output condition on the hundreds feet, tens feet, units feet, units inch and units sixteenths inch displays. The output from decode Or gate 91 is low and this is inverted to a high by inverter 100. This high drives transistor 101 collector to ground. This ground cuts off transistor 102 and the tens inches and tens sixteenths are blanked out. Flip-flop FF9 24 output $Q_9$ is high. This high drives transistor 103 to ground. This ground cuts off transistor 104 and the thousands feet display is blanked out.

(E) READ OUT AT $T_4$ GIVES ZERO SIXTEENTHS

At $T_4$ time, units sixteenths display 70 is activated by the divide by 5 counter 12. At $T_4$ time, the output of Or gate 95 is high. The output of And gate 96 is high causing the output of Nor gate 98 to go low. The output of Nor gate 99 is high since the output of monostable multivibrator O.S.2 107 is normally low and the output of Nor gate 98 is low. Since Nor gate 99 output is high, B.I. (Blanking) input on 79A is high. If B.I. is high, the inputs $E_0$-$E_3$ which are now low, are decoded to give a low on output G and highs on outputs A-F. This illuminates segments to show zero on those of L.E.D.s 70, 72, 74, 76 which are activated by digit drivers 65-69. Since only driver 69 is activated at $T_4$ time, the units sixteenths display now indicates a zero, and the rest of the display is blank.

5. DEPRESS A NON-ZERO NUMERAL KEY (A) ENCODE AND LOAD

A hexadecimal numeral key 0-15, on keyboard 1, is depressed corresponding to the component of the dimension to be handled and a signal on one of fifteen lines is sent to 0-15 hexadecimal to 0-15 binary encoder 2 which encodes the signal to a four bit binary code. (A similar sequence occurs at later stages if the zero numerical key is depressed following the first non-zero numerical key actuation.)

A strobe signal from encoder 2 is also activated and is debounced thru Schmidt trigger 4. The positive transition from the output of trigger 4 clocks the four bit data into quad clocked "D" latch 3. After the positive transition, the combination of $R_1$, $C_1$ and Schmidt trigger 4 keeps the output of trigger 4 high for a sufficient number of pulse periods. During this time interval, the four bit word is stored in latch 3 and at the end of this time interval, the output of trigger 4 goes low and the data in latch 3 is destroyed. At the beginning of the time interval data from latch 3 is conveyed to input select gate 5 whose $B_0$, $B_1$, $B_2$, $B_3$ input is receptive due to the initial clearing operation. Data from the output of input select gate 5 appears at the $B_0$, $B_1$, $B_2$, $B_3$, input of feed select gate 6 which is not yet receptive, due to the initial clearing operation. During the time interval, the following control timing occurs for entering data into receiver registers 7–10. Refer to timing sheet #1, FIG. 23.

Figure 23:
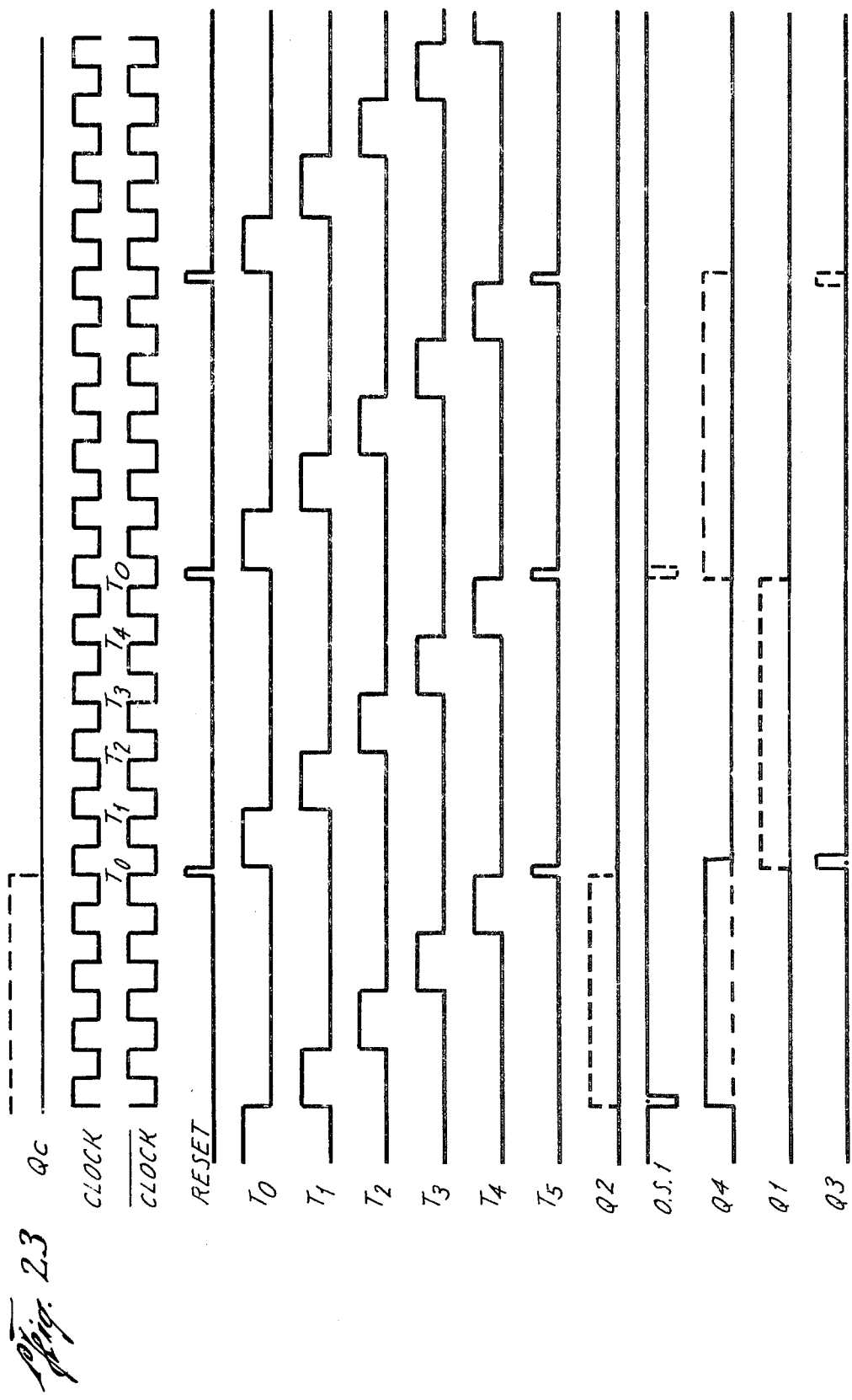

(1) AT SOME CHANCE TIME BEFORE END OF A $T_4$ PHASE, KEY ACTUATES TRIGGER The positive transition from trigger 4 at some chance time before the end of the first $T_4$ phase shown in FIG. 23, e.g. at the beginning of the $T_1$ phase as shown, although this is purely arbitrary, triggers monostable multivibrator O.S.1 108. The low level pulse from O.S.1 presets flip-flop FF4 40 to a high output $Q_4$.

(2) AT THE END OF $T_4$, LOAD AND GATE 42 ENABLED TO SUPPLY PHASE CLOCK $T_0$ TO RECEIVER REGISTERS. At the negative transition of the next $T_4$ pulse, the $Q_3$ output of flip-flop FF3 39 goes high and enables And gate 42, while $\overline{Q_3}$ disables And gate 41. This prepares receiver shift registers 7–10 to shift on the immediately following positive transition applied to And gate 42, but not on clock pulses applied to And gate 41.

(3) RECEIVER SELECT GATE INPUT 8 OPENED AT END OF $T_4$. The high from $Q_3$ is also passed thru Or gate 38 and appears at input 2 of feed select gate 6. This high passes thru Or gate 33, is inverted by inverter 34 and appears as a low on input 1 of receiver select gate 6. Gate 6 now receives information on $B_0$–$B_3$ from input select gate 5, recirculating inputs $A_0$–$A_3$ being disabled, and this data from keyboard appears on the outputs $C_0 C_3$ and the inputs to receiver registers 7–10.

(4) LOAD UP RECEIVER REGISTERS AT $T_0$ + TRANSITION. The positive transition from the immediately following $T_0$ pulse is passed thru load And gate 42 and is inverted by Nor gate 43 to a negative transition. This negative transition loads the data appearing on the outputs of the input select gate 6 into receiver shift registers 7–10.

(5) HIGH $T_0$ PHASE CLEARS FF3, FF4. $\overline{Q_3}$ is now low, enabling Or gate 105. After the positive transition of $T_0$, the high level of $T_0$ is inverted by inverter 106 and the output of Or gate 105 is a low. This low clears flip-flops FF3 39 and FF4 40.

(6) RECEIVER REGISTER DATA RECIRCULATED BY CLOCK AT $T_0$. $Q_3$ is now low and this low is passed thru Or gates 38 and 33 and is inverted by inverter 34 to a high which is passed to input 1 on feed select gate 6. The low from Or gate 38 is passed to input 2 of feed select gate 6; inputs $A_0$–$A_3$ on gate 6 are enabled while inputs $B_0$–$B_3$ are disabled. $\overline{Q_3}$ is now high, enabling And gate 41. The main clock is now passed through gates 41 and 43 and drives receiver registers 7–10. The current data is now recirculated into and out of receiver registers 7–10.

(B) Additional numeral key depressions repeat steps (4A(1)–(6)). Since each positive transition of $T_0$ shifts receiver registers 6–10 one position, successive entries are loaded into the register at successive positions, rather than on top of each other. Up to 5 4-bit data bytes are stored in the display register. The 5 bytes represent sixteenths at $T_4$ time, inches at $T_3$ time, units feet at $T_2$ time and tens feet at $T_1$ time and hundreds and one thousands feet at $T_0$ time.

6. DISPLAY CONDITION AFTER DATA ENTRY (A) DATA SENT TO DECODER
The non-zero data in the receiver register appears at the inputs to decode four bit full adder 86 at the appropriate time periods. Simultaneously, the data appears on the inputs to decode gates 87, 88 and 89.

(B) ADD SIX IN ORDER TO RECODE UNITS
Gates 87, 88, 90 and 91 are connected to the outputs of receiver registers 7–10 in a configuration that will yield a high output from gate 91 whenever the data from receiver registers 7–10 is greater than the numeral 9, or 1001 in binary, as may occur during times $T_0$, $T_4$ if the sixteenths or inches entered in receiver registers 7–10 is ten to 15. When this condition occurs, the high from Nor gate 91 appears on inputs $B_1$ and $B_2$ of decode full adder 86. Inputs $B_0$–$B_3$ are now 0110. This binary 6 is added to the data and corrects the data to give the proper units indication for decimal numerals 10–15. Depending on the input data, the output from decode adder 86 is now binary 0–5.

(C) GENERATE TENS
The high from Nor gate 91 is inverted by inverter 100 and is inverted again by transistor 101. The high output from transistor 101 turns transister 102 on and transistor 102 lights L.E.D. 71 or 73 at the proper time period to indicate tens sixteenths or tens inches.

(D) DEBLANK
The blanking input low to decoder 79A is disabled to allow each display to light at the proper time interval. In order to accomplish this, the following occurs:

(1) ENABLE THE DEBLANK OR GATE IF DATE NON-ZERO. If at $T_0$ time, non-zero data is present at deblank Or gate 89, a high is passed thru Or gate 92. This high overrides the $T_0$ clock pulse, and flip-flop FF5 94 is now cleared. The output from $\overline{Q_5}$ is now high. This high is passed thru Or gate 95 and enables And gate 96 to a high level output. Nor gate 98 output is now low. The output from O.S.2 107 is currently low. Since the two inputs to display Nor gate 99 are low, gate 99 output is a high, and the blanking input to decoder 79A is disabled. At $T_0$ time, the hundreds and thousands feet L.E.D.s are now enabled and the data is displayed.

(2) THE DEBLANK OR GATE DISABLED IF DATA IS ZERO. If at time $T_0$, the data present at gate 89 is all low, then flip-flop FF5 94 would remain in the present (PR) condition and the thousands and hundreds feet display would be blanked at $T_0$ time.

(3) Steps (1) and (2) also occur for $T_1$–$T_4$ times.

(4) ORDER OF DATA ENTRY. As previously noted and as is apparent from FIG. 10, the L.E.D.s for displaying thousands and hundreds, tens, units feet, tens and units inches, and tens and units sixteenths components of a dimension are activated at times $T_0$, $T_1$, $T_2$, $T_3$, and $T_4$, respectively. The components should be entered into the receiver registers in the same order so that when the receiver register data bytes are successively sent to the decoder from the receiver registers and the decoder is successively deblanked at times $T_0$, $T_1$, $T_2$, $T_3$, $T_4$, the correct data will read out at each L.E.D.

(5) SHIFTING DISPLAY. When only part of a dimension has been entered, the L.E.D.s will be partially illuminated according to the number of data bytes entered. The first data, e.g. hundreds feet, will first appear in the units sixteenths L.E.D. 70; the first data will next appear in the units inches L.E.D. 72 when the second data, e.g. tens feet appears at L.E.D. 70; the first data will next appear at the units feet L.E.D. 74 when units feet is entered and appears at L.E.D. 70. When inches are entered and appear at L.E.D.s 71, 70, the hundreds feet will appear at the tens feet L.E.D. 75. Finally, when sixteenths are entered and appear at L.E.D.s 71, 70, and the inches are moved over to L.E.D.s 73, 72, the hundreds feet will appear at L.E.D. 76, the tens feet at L.E.D. 75, and the units feet will appear at L.E.D. 74.

(6) HANDLING OF OMITTED DIMENSIONS. If there are no hundreds feet to be entered, the first entry may then be tens feet, appearing first at L.E.D. 70; the first entry will then be moved over one less time than in the first example as the balance of the dimension is entered, but since it is only tens feet, it does not need to move as far as the hundreds feet did in order to reach its proper display position. It is necessary to enter a zero for any zero component following the first non zero entry in order to insure proper positioning of the data; for example ten feet and two sixteenths would require the successive depression of numeral keys 1, 0, 2.

7. DEPRESS (+) ADD KEY TO ENTER FIRST DIMENSION IN ACCUMULATOR REGISTERS 48–51

(A) SET CONTROL $Q_A$, $Q_B$, and Latch $Q_A$ also, AT $T_4$, control $Q_7$ HIGH The add key is depressed and the low level is inverted and debounced thru Schmidt trigger 109. The high level from 109 forces the $Q_A$ output, from latch 115, high. In addition, the positive transition from trigger 109 generates a small high level pulse from O.S.5 112. The high level is passed thru Or gate 113. The high level from gate 113 forces the $Q_B$ output, from latch 114, high.

Also, the high from gate 113 is passed via line 206 to latch 22. Latch 22 is part of automatic clear means comprising latch 22 and flip-flops FF1 21 and FF2 19. The high from line 206 sets the $Q_C$ output of latch 22 high and the $\overline{Q}_C$ output low.

(B) ENABLE LINE 1 AND DISABLE LINE 2 OF ACCUMULATOR SELECT GATE AT $T_4+$

At $T_4$ time, the positive transition of $T_4$ sets the $Q_7$ output from flip-flop FF7 117, high. The high level from $Q_7$ on FF7 117 is passed thru enter, four input, Or gate 57A and the output of Or gate 44 is low. This low is inverted by Nor gate 45. The high from gate 45 appears on input 2 of accumulator select gate 47. The low from 44 also disables And gate 46.

The low from gate 46 appears on input 1 of accumulator select gate 47.

Inputs $B_0$–$B_7$ on gate 47 are now disabled and inputs $A_0$–$A_2$ on gate 47 are enabled.

(C) NO COMPLEMENTING

The circulating data in receiver registers 7–10 appears at the inputs to the Exclusive Or gates 118 of the main adder. Since $Q_4$ 115 is low, these gates do not invert the data present at their inputs. Such twos complementing, as required for subtraction, occurs only when the − key is depressed.

(D) SET $Q_B$ AND $Q_8$ LOW AT $T_5$

The positive transition at $T_5$ time sends $Q_8$ from flip-flop FF8 116 high. The high from $Q_8$ resets the $Q_B$ output of Nor latch 114 to a low level.

Flip-flop FF7 116 now has a low at its $D_7$ input and is, therefore, reset to a low at the next $T_4$ transition. $Q_1$ is now low and this low at the $D_8$ input of flip-flop FF8 118 resets $Q_8$ on latch 114 to a low at the following $T_5$ transition. It will thus be seen that flip-flops FF7 117 and FF8 116 together with latch 114 form a one and only one phase generator at $T_4$ time, so that later $T_4$ pulses will not add in the addend additional times.

(E) ADD (i) Add Sixteenths at $T_4$

The zero data, recirculating in accumulator registers 48–51, appears at the augend inputs $A_0$–$A_3$ of main four bit full adder 119.

At $T_4$ time, the input to enter shift register 52 is high. This high has also enabled inputs $A_0$–$A_3$ on accumulator select gate 47, as previously described. At $T_4$ time, zero sixteenths appears on the $A_0$–$A_3$ inputs to main four bit full adder 119. This zero is added to the sixteenths data from receiver registers 7–10 appearing on inputs $B_0$–$B_3$ and the resulting sum $E_0$–$E_3$ appears on the $B_0$–$B_3$ inputs of correction four bit full adder 128. Adder 128 sums this data with inputs $A_0$–$A_3$ which are currently zero. The output sum $E_0$–$E_3$ of adder 128 is now the sixteenths data from the display register.

(ii) Enter Sixteenths

At the next negative transition of the clock pulse, this data is loaded into the accumulator registers 48–51. (Refer to timing sheet no. 2, FIG. 24).

(iii) Circulate

The input to enter shift register 52 is now low and inputs $A_0$–$A_3$ on accumulator select gate 47 are disabled while inputs $B_0$–$B_3$ are enabled. The data in the accumulator registers 48–51 is recirculated for four clock pulses.

(iv) Add Inches — $T_3$

At the negative transition of the fourth clock pulse, the input of enter shift register 53 is high and $T_3$ time interval is high. At $T_3$ time, inch data appears at the $B_0 - B_3$ inputs to main adder 119. Zero data inches appears at inputs $A_0 - A_3$ of main adder 119. Adder 119 outputs $E_0 - E_3$ are now inch data from the receiver register. This data is added to zero at adder 129.

(v) Add Feet

The preceeding process occurs sequentially for times $T_2$, $T_1$, $T_0$. At these time periods, units feet, tens feet, and hundreds feet are entered into the accumulator. Each of enter shift registers 52–56 functions as a time delay means, since four clock pulses are required for a high appearing at the input of one of the registers to reach its output and be transferred to the next one. Thus, the initial high sent to register 52 from flip-flop FF7 117 at $T_4$ is sent successively to enter shift registers 53–55 at times $T_3$, $T_2$, $T_1$, $T_0$. Thereafter, it goes through register 56 to clear any subtraction carry.

8. AUTOMATICALLY CLEAR RECEIVER REGISTERS AND ENTER FIRST ADDEND (A) The addend numerals in feet, inches, and sixteenths of an inch are entered, as before, into the receiver registers. However, before the first component of the first addend dimension (second dimension keyed into adder) is loaded into receiver shift registers 7–10 these registers must be cleared of the previous dimension.

In the latter regard it may be noted that although loading in of a new full length dimension (hundreds, tens and units feet, inches, and sixteenths) would substitute the new dimension for the one previously loaded into the receiver registers, if the new dimension is of shorter length, e.g., zero hundreds feet, less than five numeral keys will be depressed and the data previously appearing at the more significant parts of the timing sequence, e.g., $T_0$ time for hundreds feet, will remain. To avoid this possibility, the automatic clear means previously mentioned comes into play, being set by the actuation of an arithmetic key (+) or (−) as previously described, and functioning upon depression of the next numerical key before the data corresponding which is loaded into the receiver registers. The automatic clearing operation will next be described, with reference to timing sheet #1, FIG. 23.

As before, actuation of one of the non-zero numerical keys marks the beginning of a new dimension being applied to the keyboard. The strobe signal from the encoder 2 activates trigger 4 and clocks data from the encoder 2 into latch 3. However, the low from $\overline{Q_C}$ output of latch 22 applied to the clear terminal of mono-stable multivibrator O.S.1 108 prevents the strobe signal from producing an output from mono-stable multivibrator O.S.1 108 and there results no high on $Q_4$ output of flip-flop FF4 40 nor, at $T_4(-)$, any high on $Q_3$ output of flip-flop FF3 39. See broken line portions of timing chart #1, FIG. 23. So the new data is not loaded into receiver registers 7–10 at this time.

Instead, the high on $Q_C$ output of latch 22 from the previous operation of an arithmetic key is clocked by the trigger pulse from the J input to the $Q_2$ output of flip-flop FF2 19 and at the next $T_0(+)$ time (positive transition of $T_0$) the high from $Q_2$ is located through flip-flop FF1 21 from its J input to its $Q_1$ output. This high clears flip-flop FF2 19 sending $Q_2$ low, resets latch 22 sending $Q_C$ low, and, more importantly, after inversion to a low by inverter 34, disables the recirculation or A input of feed select gate 6.

The B inputs of feed select gate 6 have already been disabled by the clearing of flip-flop FF3 39 by inverted $T_0$ at the end of the previous data entry. For the succeeding five clock pulses receiver registers 7–10 are clocked by main clock applied to And gate 41, flip-flop FF(3) being clear as previously noted. The registers 7–10 being exposed to all zeros at the C outputs of feed select gate 6 are cleared.

At $T_5(+)$ time, flip-flop FF1 21 is cleared resulting in a low on its $Q_1$. The negative transition of $Q_1$ is fed to the clock input of FF4 (40) shifting its $Q_4$ outtput to a high $\overline{Q_C}$ being high, mono-stable multivibrator O.S.1 is no longer cleared and is enabled to function in response to the continuing pulse from trigger 4. This high on $Q_4$ is clocked through FF3 (39) from its J input to its $Q_3$ output at $T_4(-)$, the next negative transition of $T_4$. The resultant high at $Q_3$ enables And gate 42 which functions at the next $T_0$ time to load in the new data. Also at $T_0$, flip-flops FF3 39 and FF4 40 are cleared sending $Q_3$ and $Q_4$ low.

9. DEPRESS ADD (+) KEY.

(A) ADD SIXTEENTHS AT $T_4$

At the high level of $T_4$ time, accumulator select gate 47 inputs $A_0 - A_3$ are enabled. At this time the input data to main adder 119 is augend sixteenths from the accumulator registers 48–54 and addend sixteenths from the receiver registers 7–10. The four bit sum appears on lines $E_0 - E_3$ of main adder 119.

(B) COMPARE

Sum outputs $E_0 - E_3$) from main adder 119 appear on inputs $A_0 - A_3$ of 4-bit magnitude comparator 120. The value of $E_0 - E_3$ is compared with a constant value on inputs $B_0 - B_3$ of comparator 120. The constants are binary 15 (1111) for sixteenths, binary 11 (1011) for inches, and binary 9 (1001) for feet. The constants are generated at their appropriate time interval $T_0 - T_4$.

(C) GENERATE CONSTANTS

Section A (brokenline border on FIG. 17 of schematic) generates the following sequential state code on the two lines to $B_1$, $B_2$ of comparator (120):

(1) Binary 11 at $T_4$ time for sixteenths
(2) Binary 01 at $T_3$ time for inches
(3) Binary 00 at $T_2$ time for units feet
(4) Binary 00 at $T_1$ time for tens feet
(5) Binary 00 at $T_0$ time for hundreds feet Section A receives phase clock pulses from Nor gate (45), which is pulsed from enter shift registers 52–55, at $T_4 - T_0$ times. These codes combine at comparator 120 on lines 129 and 131 to produce the constants 1111, 1011, 1001, 1001, 1001, corresponding to the next sum thru the $C_{in}$ input on main adder 119.

(F) CORRECT

Section B (Brokenline Border on FIG. 15 of Schematic) adds a constant to the sum from main adder 119. The constants are generated on the following conditions:

(1) Sixteenths: (No correction required)
  (a) Add zero to sums 0–31.
(2) Inches: (No correction unless sum is over 11)
  (a) Add zero to sums less than or equal to 11
  (b) Subtract 12 from sum for sums equal to or over 12 and equal to or less than 15.
  (c) Add four to sum for sums equal to or greater than 16 and equal to or less than 22.
(3) Feet: (No correction unless sum over 9)
  (a) Add zero to sum if the sum is less than or equal to nine.
  (b) Subtract 10 from sum for sums equal to or over 10 and equal to or less than 15.
  (c) Add six to sum for sums equal to or over 16 and equal to or less than 18.

10. ENTER SUBTRAHEND AND DEPRESS SUBTRACT (−) KEY (A) ENTER

The subtrahend, in feet, inches and sixteenths of an inch, is entered into the receiver registers 7–10.

(B) SUBTRACT

When the subtract key is depressed, the number in the receiver registers is subtracted from the number in the accumulator registers. The timing is identical to an add operation. The following differences in logic occur:

(1) Invert

Latch 115 $\overline{Q}_a$ output is now set high by Schmidt trigger 110. The high from $\overline{Q}_a$ appears on the inputs to quad exclusive-Or gate 118. The exclusive-Or gate 118 now inverts the inputs from the receiver registers 7–10.

(2) Borrow the $Q_{10}$ output of flip-flop FF10 25 is preset to a high level when the pulse from monostable multivibrator O.S.4 111 occurs, initiating a subtract operation.

If the subtrahend is less than or equal to the minuend, there is no borrow from the succeeding stage and the output of $Q_{11}$ is a high. This high appears on the $C_{in}$ input of main adder 119.

If the subtrahend is greater than the minuend, the D input to flip-flop FF10 23 is low and $Q_{10}$ is low at the proper time interval. $Q_{11}$ goes low at the succeeding time interval and the $C_{in}$ input becomes low, providing the borrow.

(3) CORRECT

Section B modifies the outputs $E_0$–$E_3$ from main adder 119 in the following manner:

(a) Sixteenths: (No correction required)
  (1) Add zero to sum for all values.
(b) Inches:
  (1) For subtrahend less than the minuend, add zero to sum.
  (2) For subtrahend greater than the minuend, add 12 to the sum.
(c) Feet:
  (1) For subtrahend less than the minuend, add zero to sum.
  (2) For subtrahend greater than the minuend, add 10 to the sum.

11. CLEARING THE CARRY FLIP-FLOP (A) After the time intervals ($T_0$–$T_4$) have occurred, it is necessary to clear carry flip-flops FF10 23 and FF11 26 after a subtract operation has occurred. This is accomplished by shifting the high level from enter shift register 55 thru enter shift register 56. After a delay of four clock intervals the high from shift register 56 is passed thru Nand gate 124 and inverted to a high by inverter 125. This high passes thru Or gate 125 and clears flip-flops FF10 25 and FF11 26. The four clock interval delay in register 56 is merely convenient. A single clock pulse delay would be sufficient.

12. DEPRESS TOTAL (=) KEY.

(A) SHIFT RECEIVER INPUT SELECT GATE

The total key is depressed and monostable multivibrator O.S.3 146 is triggered. The low level pulse from Q sets the output of latch 13 high. This high appears on the D input of flip-flop FF6 16. At $T_0$ time, $Q_6$ goes high and $\overline{Q}_6$ goes low. Inputs 1 and 2, on input select gate 5 are low (line 18) and high (line 17). This condition on input select 5 causes inputs $A_0$–$A_3$ to be enabled, and inputs $B_0$–$B_3$ to be disabled.

(B) SHIFT FEED SELECT GATE

The high from $Q_6$ is also passed thru Or gate 38. Input 2 of feed select gate 6, is now high and input 1 of gate 6 is low. Inputs $B_0$–$B_3$ on gate 6 are now enabled and inputs $A_0$–$A_3$ are disabled.

(C) LOAD TOTAL

The next five negative clock transitions, in the interval $T_0$–$T_5$, load the data recirculating in the accumulator register into the receiver registers 7–10. At $T_5$ time, flip-flop FF6 16 is cleared and inputs $B_0$–$B_3$ on input and feed select gates 5 and 6 are enabled and the totals are displayed by the L.E.D.s.

(D) RESET CONTROL LATCH

The output, $Q_6$, of flip-flop FF6 16 also is inverted by Nor gate 14. The output of gate 14 resets latch 13 to a low output.

(E) OVERFLOW READ OUT

If overflow on addition has occurred, Nor gate 93 has a low input from $Q_{10}$ output of flip-flop FF10 25 (overflow) and a low input from output $Q_A$ of Nor latch 115, (addition). The output of gate 93 is now high. This high appears on the J input to flip-flop FF9 24. When mono-stable multivibrator O.S.3 146 is triggered, flip-flop FF9 24 is clocked to a high output from $\overline{Q}_9$ and a low from $Q_9$. This high is inverted by transistor 103 and the low from transistor 103 saturates transistor 104. Transistor 104 now lights overflow L.E.D. 70 to show one thousand feet.

13. ERROR INDICATION (a) If an attempt is made to add or subtract a number from a total in the accumulator that has an overflow, then the 2 Hz. oscillator 150 will cause the display to turn on and off at this rate.

(1) If an overflow is present, then the $Q_{10}$ output of flip-flop FF10 25 is high. This high level appears on one input of And gate 140. The other input of gate 140 is connected to Nand gate 136 whose inputs are $\overline{Q}_4$ and $\overline{Q}_5$ from monostable multivibrators O.S.4 111 and O.S.5 112 which are triggered by the subtract and add keys respectively.

(2) when the (+) key is depressed, a positive pulse from multivibrator O.S.5 112 combines with the high level from flip-flop FF10 25 to produce a positive pulse at the output of And gate 140. This pulse produces a low from Nor gate 137. This low is inverted by inverter 135. The high pulse from inverter 135 flips Nor R-S Latch 23. A high now appears on And gate 97. This high enables gate 97 and the output of 2Hz. oscillator 150 appears on the output to Nor gate 98. The output from Nor Gate 98 is passed through Nor gate 99. Nor gate 99 is connected to the blanking input of decoder 79A. The 2 Hz. signal on the blanking input now causes the entire display to be turned on and off at a 2 Hz. rate regardless of any data that may be displayed by the L.E.D.s.

(3) For subtraction, the $Q_9$ output of flip-flop FF9 24 is high if an overflow is present. The high from $Q_9$ combines with the $Q_4$ output of multivibrator O.S.4 111 at And gate 139. If the subtract (−) key is depressed, and overflow is present, a pulse appears at the output of And gate 139 and the input to Nor gate 137. The low from gate 137 is inverted by inverter 135 and the high pulse from inverter 135 flips Nor latch 23. And gate 97 now passes the 2 Hz. clock to Nor gate 98. The output of gate 98 passes through Nor gate 99 and to the blanking input of decoder 79A as before.

(B) If an attempt is made to shift the hexadecimal numerals 10-15 into the feet display, the 2 Hz. oscillator will cause the entire display to turn on and off at this rate.

(1) The inputs to Nor gate 138 are outputs of decode inverter 100 and $\overline{T}_2$. The output of 138 will be high when these inputs are low. The output of 100 is low when Nor gate 91 has a high output, i.e. when both of its inputs are low. The input from monostable multivibrator O.S.2 107 is normally low and goes high only after a 2 minute delay in order to save battery. The input from gate 90 is low when the numbers 10-15 are present in the receiver registers 7-10. $T_2$ input is low at the high level of $T_2$ time. At $T_2$ time, units feet is being displayed. Consequently, if numerals 10-15 are present in the display at this time, the output of Nor gate 138 will be high and this high will pass through Nor gate 137 and inverter 135. Latch 23 is now flipped and the 2 Hz. clock flashes the display as before.

(C) Depressing the clear C key flips latch 23 and the error indication is removed.

14. ADD — SUBTRACT LIGHT

The Add-Subtract indicator L.E.D. 148 flashes whenever Or gate 147 receives a high level pulse from Schmidt trigger 109 or 110. These are activated by the Add or Subtract keys. This indicator is included to aid the operator in counting multiple additions or subtractions of the same number.

15. CLEAR LAST ENTRY

If it is desired to remove the data just entered, neither the add or subtract key having been actuated, the CE key (clear entry) may be actuated. The resulting low applied to inverter 35 transmits a high to Or gate 32. This high is passed through Or gate 33 and inverter 34 passes a low to disable inputs $B_0$ – $B_3$ of feed select gate 6. This results in a set of zeros being loaded into receiver registers 7-10 while the data in latch 3 is disappearing, thereby deleting the last entry without destroying the data in the accumulator.

16. BATTERY SAVER

Monostable multivibrator O.S.2 107 has a high output in the absence of any input. Such a high output is inverted by Nor gate 99 to a low which is applied to the B.I. input of decoder 79A. Display L.E.D.s 70, 72, 74-76 are therefore dark. However whenever the apparatus is in use the strobe signals from encoder 2 generated when numeral keys on keyboard 1 are used will activate Schmidt trigger 4. Signals from trigger 4 are thus continually applied to multivibrator O.S.2 107 and keep its output low to allow L.E.D.s 70, 72, 74-76 to light up. Multivibrator O.S.2 107 will not drop back to its stable high output condition unless it receives no input for 2 minutes; if a numerical key of the keyboard is not used for that length of time, L.E.D.s 70, 72, 74-76 go out, thereby saving the battery. However the data in the apparatus is retained.

To relight the L.E.D.s display key D (FIG. 11) may be actuated to send a low input directly to multivibrator O.S.2 107. The last previous data in the receiver registers 7-10 will then be read out. Also, if it is not desired to read out the previous data, a further entry of data using the numerical keys 0-15 will also relight the L.E.D.s 70, 72, 74-76.

L.E.D.s 71, 73 are similarly blanked out by multivibrator O.S.2 107 acting through Nor gate 91, inverter 100, and transistors 101-102, whenever there is non-use of the apparatus for over two minutes, and are reenabled by actuation of a numerical key or display key D.

The high from $Q_2$ of O.S.2 turns transistor 141 on. Transistor 104 is now turned off by 141 and L.E.D. 77 is blanked out.

V. Timing (a) General

Timing is an important aspect of the invention and although the order of events has been specifically described and is pictorially set forth in the three timing sheets, FIGS. 23, 24, and 25, a few additional words of description will assist in comprehending the matters there portrayed. Before discussing the timing sheet individually, a few background points need to be made.

First of all, it needs to be mentioned that FF3(39) and FF4(40) change state upon application of high to low (negative) transitions, whereas all the others, including those of the accumulator and receiver shift registers, change state upon application of low to high (positive) transitions.

Secondly, it is pointed out that the $T_5$ pulses, though shown on the drawings as rectangular pulses of some width, are in fact mere spikes, of the order of 20 nanoseconds width occurring in between the $T_4$ and $T_0$ pulses. Because the $T_5$ pulses have been portrayed as having a certain width, there results on the drawing a slight migration of the $T_0$-$T_4$ pulses relative to the clock pulses, but the resultant asynchronism is not real, being merely the result of draftsman's license, and in fact each of the pulses $T_0$–$T_4$ commences as a clock pulse rises from zero to positive.

Thirdly, according to the terminology herein, the first dimension keyed in is not an addend, there being no augend in the register; the second dimension keyed in is the first addend.

Fourthly, the three timing sheets are intended to illustrate three different aspects of the operation of the apparatus, as follows:

FIG. 23 — Entering Data Upon Actuation of One Numerical Key and Automatic Clearing Upon Keying First Component Of Each Addend FIG. 24 — Computation Upon Actuation of One Arithmetic Key (+) or (−) and FIG. 25 — Handling of Carries and Borrows (b) Loading One Data Byte (i) First Dimension The initial clearing operation has placed automatic clear latch 22 in a low $Q_C$ output condition (all solid line graph of FIG. 23) and $\overline{Q}_C$ is high.

Upon actuation of a numerical key, trigger 4 sends out a signal. This has no effect on automatic clear flip-flop FF2(19) and FF1(21) since $Q_C$ is low and $Q_2$ and $Q_1$ stay low (see solid line graphs in FIG. 23).

However, $Q_c$ being high, the load means of FIG. 8 comes into operation. At whatever chance time the trigger pulse occurs, one-shot O.S.1(108) goes low and presets $Q_4$ high. These are the first solid line events occurring in FIG. 23 other than clock, bar clock, and phase clock.

Shortly thereafter one-shot O.S.1(108) returns by itself to a high output corresponding to the high on its clear input from $Q_c$. This is the next event shown in FIG. 23. However, the high preset on $Q_4$ of flip-flop FF4(40) remains.

At the next negative transition of $T_4$, the high from $Q_4$ of flip-flop FF4(40) is clocked through flip-flop FF3(39) from its J input to its $Q_3$ output. This $Q_3$ stays high until the positive condition of $T_0$ acting via inverter 106. This short pulse on $Q_3$ is the next event shown in FIG. 23. Also at high $T_0$ time, $Q_4$ goes low.

The short $Q_3$ pulse prepares gate 6 so that the concurrent $T_0$ positive transition loads the data into the receiver registers 7-10. Thereafter, until the next $T_0$ positive transition, the absence of a high on $Q_3$, and the presence of a high on $\overline{Q}_3$, allows the main clock on gate 41 to circulate the data in the shift registers for four clock pulses to move the data four positions. The next component of the dimension keyed in will therefore be loaded in at an adjacent position. This sequence will be repeated until the entire dimension has been keyed in and loaded into the receiver registers. Actuation of an arithmetic key (+) or (−) then enters the dimension in the accumulation registers 48-51.

(ii) First Component of Addend

The first component of the first addend is then keyed in. FIG. 23 shows in broken lines that $Q_c$ of latch 22 is initially high due to operation of an arithmetic key (+) or (−). Correspondingly $\overline{Q}_c$ is low. Upon actuation of a numerical key, Trigger 4 sends a signal to O.S.1(108) as before, but the positive transition has no effect due to the $\overline{Q}_3$ low on the clear input of O.S.1 (108). The loading sequence via flip-flops FF4(40) and FF3(39) previously described following actuation of one-shot O.S.1(108) is delayed until occurrence of a negative transition on the clock input of flip-flop FF4(40) transmitted from $Q_1$ of flip-flop FF1(21), the occurrence of which is at the end of the automatic clear sequence next to be described.

The strobe signals negative transition causes $Q_2$ to go high, as shown in broken lines in FIG. 23.

At the next position transition of $T_0$, $Q_1$ goes high. This has the same effect as previously described upon actuation of the clear key, applying a high to Or gate 31. Shift registers 7-10 are therefore cleared.

The aforementioned $T_0$ positive transition also feeds back through Or gate (20) to flip-flop FF2(19) and latch (22) to send $Q_2$ and $Q_c$ low, as shown in broken lines in FIG. 23.

The clearing of receiver registers continues until $T_5$ time, whereupon flip-flop FF1(21) is cleared, dropping $Q_1$ to a low as shown in broken lines in FIG. 23.

This low on $Q_1$ clocks flip-flop FF4(40) sending $Q_4$ high, as shown in broken lines in FIG. 23.

The operating then proceeds as before described upon keying in the first dimension. Namely, at the next negative transition of $T_4$, $Q_3$ goes high as shown in broken lines in FIG. 23, and loading commences with this immediately following $T_0$ positive transition. Also, positive $T_0$, via inverter 106, clears flip-flop FF3(39) and FF4(40), sending $Q_3$ and $Q_4$ to to lows, as shown in FIG. 23.

(c) Computing — Time Sequence Reversal

Referring now to FIG. 24, there is portrayed the sequence of events at enter shift registers 52-55 during a computation, addition or subtraction, both of which call for functioning of the main adder and the accumulator shift registers.

It is to be notice that data is loaded into the receiver shift registers feet first, that is, first hundreds, tens, and units feet, then inches, then sixteenths, since that is the normal way of reading and writing a number, i.e., largest significant figure first, and that is the order an operator will use in actuating the keyboard.

Though each element of a dimension will be loaded into the receiver registers 7-10 on a positive transition of a $T_0$ pulse, the registers 7-10 shift with each loading so that when a whole dimension has been loaded in, the data appearing at the registers' outputs will be hundreds feet at $T_0$, tens feet at $T_1$, units feet at $T_2$, inches at $T_3$, and sixteenths inch at $T_4$. However such data must be presented to the main adder 119 in the reverse order, namely, $T_4$, $T_3$, $T_2$, $T_1$ $T_0$ in order that the proper carries are used. Generation of such a reversed time sequence is effected by means of the enter shift registers 52-55.

When a compute key (+) or (−) is actuated, a high will appear at the input to enter shift register 52 at $T_4$ time. This high will allow the result from the correction adder 128 to be entered into the accumulator shift registers by the next bar clock negative transition. At that time the result will be the sum (or difference) of sixteenths inch data appearing at the outputs of receiver registers 7-10 and accumulator registers 48-51. It is next desired to add inches together, with any carry from the sixteenths inch addition, but inch data appears at $T_3$ time. It is therefore necessary to wait through times $T_0$, $T_1$, $T_2$ without entering any further data into the accumulator registers, the data therein merely circulating at these times. During the latter part of $T_4$ time, and again during each of times $T_3$, $T_2$, $T_1$, bar clock negative transitions applied to enter shift register 52 move the initial high on the input to register 52 along to its output so that it reappears at $T_3$ time. Then the result in the adder is the sum (or difference) of inches from the receiver shift registers 7-10 and from the accumulator shift registers 48–51, plus (or minus) any sixteenths inch carry (or borrow).

The enter shift registers 52–55 thus pass the initial positive enter signal from $Q_7$ of flip-flop FF7 from one register to the next, with the signal successively appearing on the inputs to Or gate 57A at times $T_4$, $T_3$, $T_2$, $T_1$, $T_0$ which is the desired reverse sequence for addition.

It will be noted, however, that the data thus entered into the accumulator registers 48–51, though entered fractions first, will actually be arranged in the same order in the accumulator registers 48–51 as in the receiver registers 7–10 because after each entry the data in the accumulator registers is moved four places internally before the net entry is made, this time delay being because of the time sequence effected by the enter shift registers 52–55. Therefore, when the total or result key (=) in the control section is actuated, the data stored in the accumulator registers 48–51 will be loaded into the receiver registers 7–10 feet first, thereby to produce a correct read out.

(d) Carry

When one set of data bytes, one from the receiver registers 7–10 and one from the accumulator registers 48–51 are added (or subtracted), there may or may not be a carry (or borrow). Such a carry or borrow transfer bit must be stored until the next phase of the time sequence when a computation is to be made and entered into the accumulator. Since computations are made using the reversed time sequence, $T_4$–$T_0$, the transfer bit must be stored through four bar clock pulses, the same period required for a high to pass through one of the enter shift registers.

FIG. 25 portrays the reversed time sequence $T_4$–$T_0$ in comparison to bar clock. It also shows that flip-flop FF11(26) is clocked on the positive transitions of the outputs from enter shift registers 52–55, corresponding to times $T_4$, $T_3$, etc., the reverse time sequence. Whatever transfer bit, if any, has previously been stored in flip-flop FF10 (25) is at this time transferred from terminal D to terminal $Q_{11}$ of flip-flop FF11(26) and is delivered to the $C_{in}$ terminal of main adder 119. Shortly thereafter, on the occurrence of bar clock, the new transfer bit from Nor Gate 121 of the carry generator is transferred from the D input to the $Q_{10}$ output of flip-flop FF10(25) for storage until the next phase of the reverse time sequence. FIG. 25 shows a like series of events taking place at $T_3$, at which time the positive transition of clock pulse $T_3$ sends the previous $T_4$ time transfer bit to the main adder, and the positive transition of bar clock in $T_3$ time stores the new transfer bit in flip-flop FF10(25).

From the foregoing it will be seen that the reverse time sequence controls not only the order of presentation of addend (or subtrahend) and augend (or minuend) to the adder but also the presentation of the transfer bits, be they carries or borrows.

VI. Multiplication and Subtraction

The apparatus can also be used for multiplication or division.

For example, if it is desired to known how much steel is required for five beams each 13 feet, 10 inches, and 13/16 inch in length, that length is inserted with the keyboard and the add key is actuated five times to produce the answer.

Also, if it is desired to know how many steps each 3 feet, 2-3/16 inches long can be cut from a board 16 feet, 8½ inches in length, the length of the board is first inserted, then the length of a step inserted followed by repeated actuations of the subtract key, which are counted, until the remainder in the readout is less than the length of a step.

VII. Other Denominate Numbers

The addition of three component compound denominate numbers in which the less significant components each can be expressed as fractions of the next more significant components, which fractions have denominators that are not over sixteen, is most easily handled by the present invention. That is so because the number 15 is the largest that can be represented in binary by four bits, and most integrated circuits are set up to handle only four bits in parallel.

The case of a fraction having sixteen for a denominator is a desirable application of the present invention, since there need be no correction of the adder output or internal modification thereof to generate carries at less than 16.

The invention is therefore well adapted not only for adding compound denominate numbers composed of feet, inches, and sixteenths, but such other compound denominate numbers as stones, pounds, and ounces (16 ounces to a pound, 14 pounds to a stone), and gallons, pints, and ounces (16 fluid ounces to a pint, 8 pints to a gallon). The modifications required would primarily be in the constant generation and correction sections of the apparatus.

The invention could also be adapted to adding other compound denominator numbers, e.g., having over three components, such a dry measure bushels, pecks, quarts and pints (2pints = 1 quart, 8 quarts = 1 peck, 4 pecks = 1 bushel) or less than three components such as miles and furlongs (8 furlongs = 1 mile). The addition of compound denominate numbers having ratios greater than 16, e.g., ells and inches (one ell = 45 inches) would be more difficult, since a feature of the invention is employment of a keyboard counting to a number base equal to the ratio of the larger to smaller units whereby only a single key need be used for feeding in the smaller component. In the case of inches and ells, a 45 numerical key keyboard would be required.

The apparatus could be provided with switches to change the arithmetic section at will whereby different denominate numbers could be handled by the one apparatus.

VIII. Components

The various components of the apparatus shown schematically in the circuit diagram of FIGS. 3–22 are believed to be well known to those skilled in the art. In a physical embodiment of the invention, a number of commercially available integrated circuits have been employed to supply most of these components, only a few discrete components such as resistors and capacitors having been used. There follows a list of the integrated circuit complement employed.

| INTEGRATED CIRCUIT COMPLEMENT | | |
|---|---|---|
| Quantity | RCA Type No. | Description |
| 1 | CD 4511BE | B.C.D. - to - seven segment latch decoder/driver |
| 2 | CD 4532BE | 8-input priority encoder |
| 3 | CD 4071BE | Quad 2-input Or gate |
| 5 | CD 4009AE | Hex Buffer/converter (inverting type) |

-continued

INTEGRATED CIRCUIT COMPLEMENT

| Quantity | RCA Type No. | Description |
|---|---|---|
| 5 | CD 4001 AE | Quad 2-input Nor gate |
| 3 | CD 4081BE | Quad 2-input And gate |
| 2 | CD 4072BE | Dual 4-input Or gate |
| 3 | CD 4019AE | Quad and-or Select Gate |
| 2 | CD 4098BE | Dual Retriggerable/resettable Monostable Multivibrator (one shot) |
| 3 | CD 4013AE | Dual "D" type Flip-flop with set/reset capability |
| 3 | CD 4085BE | Dual 2-wide 2-input And-Or invert gate |
| 4 | CD 4006AE | 18 stage static shift register |
| 1 | CD 4022AE | Divide-by-8 counter/divider with 8 decoded outputs |
| 3 | CD 4027AE | dual J-K master-slave Flip-flop with set/reset capability |
| 1 | CD 4070BE | Quad Exclusive-Or gate |
| 3 | CD 4008AE | 4 bit full adder with parallel carry-out |
| 1 | CD 4063BE | 4-bit magnitude comparator |
| 1 | CD 4011BE | Quad 2-input Nand Gate |
| 1 | CD 4042BE | Quad Clocked "D" latch |
| 1 | CA 3083 | General purpose high-current N-P-N Transistor Array |
| | National Semiconductor Type No. | |
| 1 | MM 74C14N | Hex Schmitt Trigger |
| 1 | MM 74C76N | Dual J-K Flip-flops with clear and preset |
| | Texas Instruments | |
| 1 | 75492 | Hex Digit driver for interfacing Between MOS and visible ligh emitting diode displays |
| Total: 51 | | |

With respect to Section A, the code generator, it is to be noted that this section employs flip-flops as well as combinatorial logic and was designed using transition mapping, with the following conditions:

Inputs
(1) Phase Clock ($T_0$-$T_4$)
(2) Bar clear

Outputs
Particular Constants on lines:

|  | 129 | 131 | 130 |
|---|---|---|---|
| 1/16 | 1 | 1 | 0 |
| in. | 0 | 1 | 0 |
| units feet | 0 | 0 | 1 |
| tens feet | 0 | 0 | 1 |
| hundreds feet | 0 | 0 | 1 |

With respect to Section B, the constants adder, it is to be noted that this section uses only combinatorial logic. It was designed using Karnaugh mapping, with the following conditions:

Inputs
(1) Adding or Subtracting
(2) Carry (or Borrow) or No Carry (or Borrow)
(3) Enter 1/16, inches, units feet, tens feet, or hundreds feet code from constants generator Outputs
Constants set forth in the foregoing description at IV-9(F) for addition and IV-10(B)(3) for subtraction.

With respect to the divide by 8 counter, it has its #6 output connected to its reset and its #7 and #8 outputs not used. Therefore, it functions as a divide by 5 counter, producing 5 wide pulses at $T_0$-$T_4$ and a spike at $T_5$.

IX. Compendium of Data

A compendium of data accompanying this specification includes selected pages from manufacturer's reference books and other data regarding some of the more sophisticated integrated circuits.

The compendium also includes a block diagram of the whole electric circuit and a one sheet print of the detailed electrict circuit of FIGS. 3–22.

X. Conclusion

While a preferred embodiment of the invention has been shown and described and various possible modifications have been suggested, many other modifications can be made by one skilled in the art without departing from the spirit of the invention.

I claim:

1. Apparatus for adding compound denominate numbers which numbers include a plurality of component dimensions wherein the greatest ratio of the size of any component dimension to that of the next most significant component is $k$ and $k$ is greater than 10, said apparatus comprising:
   A. input means including:
      a keyboard including $k$ numerical keys, and encoding means controlled by the keyboard for binary coding all numerals forming a base $k$ counting system,
   B. operating means including:
      adding means for adding binary coded base $k$ numerals,
      modifying means for correcting the result from the adding means when adding numerals belonging to numbers counted in number systems having a base lower than $k$,
   C. timing means including:
      entering means for successively feeding the binary coded numerals composing the denominate number from said input means to said adding means, least significant numerals first, and activating the modifying means when numerals belonging to numbers counted in number systems having a base lower than $k$ are being added; and
   D. output means including:
      readout means to show the corrected result.

2. Apparatus according to claim 1,
   $k$ being sixteen,
   said keyboard having 16 numerical keys,
   numerical keys greater than nine being visually distinguished by common distinguishing means from keys zero through nine.

3. Apparatus according to claim 1,
   said keyboard including an arithmetic key,
   said entering means being activated by actuation of said arithmetic key each time said arithmetic key is actuated to repeatedly enter the denominate number from said input even if no new denominate number has been encoded by further actuation of the keyboard of the input means so that a denominate number once encoded by the keyboard can be repeatedly entered by actuation of the arithmetic key without further actuation of the numerical keys.

4. Apparatus according to claim 1 wherein the dimension components are feet, inches, and sixteenths of an inch, and $k$ is 16.

5. Apparatus according to claim 4,
said modifying means including
correction means to add to the result from said adding means constants as follows:
zero when sixteenths are being added,
zero when inches are being added except subtract 12 from adding means results ranging from 12 to 15 and add four for such results ranging from 16 to 22,
zero when feet are being added except subtract 10 from adding means result ranging from 10 to 15 and add six to adding means results ranging from 16 to 18.

6. Apparatus according to claim 5,
said adding means including
binary complementing means activatable when subtraction is to be performed for inverting the binary coded numerals from said input means fed to said adding means,
said correction means further including means to add to the result from said adding means constants as follows:
zero when sixteenths are being subtracted,
zero when inches are being subtracted and the subtrahend does not exceed the minuend, but otherwise add 12,
zero when feet are being subtracted and the sutractrend does not exceed the minuend, but otherwise add 10.

7. Apparatus according to claim 5
said modifying means further including
constants generator means to generate at successive times the constants, 9, 11, and 15 when feet, inches, and sixteenths numerals respectively, are being added,
comparator means to compare the output of the constants generator with the result from the main adder to produce carries when such such results exceeds the constant from the generator and feed the carries to the adding means except for the most significant carry which is sent to the most significant display means of the readout means.

8. Apparatus according to claim 1,
said readout means having numeral display means equal in number to that required to display the corrected result with each dimension component counted in decimal,
said output means further including:
converter means for converting binary data from the encoding means to decimal signals for actuating the display means.

9. Apparatus according to claim 8 wherein the dimension components are feet, inches, and sixteenths of an inch, $k$ is 16, and the number of numeral display means is five more than the number of numerals in the largest feet dimension to be added.

10. Apparatus according to claim 8,
said operating means including $s$ $t$-bit accumulator shift registers to store corrected results from said adding means, $s$ being the number of bits required to represent $k$ in binary and $t$ being the number of bytes necessary to represent the dimension,
said input means also including $s$ $t$-bit receiver shift registers to store the dimension selectively received from the encoder or the accumulator shift registers,
said output means being connected to said receiver shift registers.

11. Apparatus according to claim 10,
said timing means including clock means to generate a series of timing pulses,
said input means including means to load the successive outputs of the encoding means into the receiver shift registers most significant numerals first and to circulate the data in the receiver shift registers at successive timing pulses to make the several bytes in the receiver registers available at the outputs thereof sequentially at the successive timing phases corresponding to said pulses,
the outputs of said receiver shift registers selectively feeding said output means and said accumulator shift registers.

12. Apparatus according to claim 11,
said input means including means selectively to feed output from said encoding means and output from said accumulator shift registers to said receiver shift registers.

13. Apparatus according to claim 4,
said output means including means to supply decimal signals from said converting means to a plurality of said display means in parallel
deblanking means to deblank all of said plurality of display means during all of said successive time phase, and
means to drive selected ones of said plurality of display means at each of said successive time phases.

14. Apparatus according to claim 13,
said keyboard including an override key,
said deblanking means further including:
time delay means to disable said display means upon non-actuation of a numeral key for a predetermined time, and
means to override said time delay means upon actuation of a numeral key, and
means to override said time delay means upon actuation of said override key.

15. Apparatus according to claim 13,
said entering means including means to select data from said receiver register in the reverse order from that in which it appears at the receiver register outputs and deliver same to the adding means in such reverse order.

16. Apparatus according to claim 13,
said output means including an oscillator operating at a frequency slower than the fastest discernable by the human eye,
said output means further including:
flash error means to connect said oscillator to said deblanking means to cause all of said display means to flash on and off at the frequency of said oscillator upon occurrence of a certain condition.

17. Apparatus according to claim 16,
said conditions being employment of a greater than nine numeral key to enter the most significant dimension and the loading thereof into the most significant stage of the receiver shift registers.

18. Apparatus according to claim 16,
said condition being the appearance of a numeral in the most significant of the display means and the subsequent actuation of a numeral key.

19. Apparatus according to claim 10,
said input means further including
clear means to disconnect said receiver registers from said encoding means while said loading means circulates the data in the registers, said clear means functioning upon the occurrence of a certain condition.

20. Apparatus according to claim 19,
said keyboard including a clear last entry key, said condition being actuation of said clear last entry key.

21. Apparatus according to claim 19,
said keyboard including a clear key, said condition being actuation of said clear key,
said input further including means responsive to actuation of the clear key to clear the accumulator shift registers.

22. Apparatus according to claim 19,
said keyboard including at least one arithmetic key, said condition being actuation of an arithmetic key followed by actuation of a numerical key,
said loading means including time delay means actuated upon occurrence of said condition effective to allow time for clearing said shaft registers prior to loading of new data into the receiver shift registers.

23. Apparatus for adding and subtracting denominate numbers, namely, dimensions including hundreds, tens, and units in feet, inches, and sixteenths of an inch, comprising:
means for generating five timing phases,
a hexadecimal keyboard,
a hexadecimal to binary coded hexadecimal encoder actuated by said keyboard,
a quad latch for receiving binary coded data from said encoder,
a first quad gate receiving on one of its inputs binary coded data from said latch,
a second quad gate receiving on one of the inputs data from the first quad gate;
four five-bit receiver shift registers receiving data from said second gate, means to circulate said data back to the other input of said second gate and into the receiver registers at each of said timing phases,
seven multi-segment light emitting diode display units,
a first correction full adder receiving data on one input from the receiver registers,
an add six generator means delivering data to another input of the first correction full adder when the data received from the receiver registers on said one input exceeds nine,
a binary coded decimal to seven segment decoder receiving data from the output of the correction full adder,
a tens of inches and tens of sixteenths energizer controlled by the add six generator and activating the corresponding light emitting diodes,
a main full adder receiving on one of its inputs data from the receiver registers,
a second correction full adder receiving on one of its inputs data from the output of the main full adder,
a constants generator means generating constants 9, 11, and 15 during different ones of said timing phases,
a comparator means having one of its inputs connected to said constants generator and its other input connected to the output of the main adder to supply carries to the main adder according to whether or not the sum from the main adder exceeds the constant from the constants generator means at that time,
logic means for correcting the output of the main adder during different time phases, the output of said logic means being connected to the other input of said logic means being connected to the other input of the second correction full adder,
a third quad gate having one of its inputs connected to the output of the second correction adder,
four multi-bit accumulator shift registers having a bit multiplicity equal to that of the receiver shift registers and having an input connected to the output of the third quad latch, the output of said accumulator shift registers being connected to the other input of the third quad gate and to the other input of said main full adder and to the other input of the first quad gate, and
control means to shift said gates between conditions passing data on one or the other of their inputs selectively to read out the data entered on the keyboard and the total of the data sequentially entered on the keyboard.

* * * * *

UNITED STATES PATENT AND TRADEMARK OFFICE
CERTIFICATE OF CORRECTION

PATENT NO. : 4,100,603
DATED : July 11, 1978
INVENTOR(S) : John Oliver Boyd

It is certified that error appears in the above-identified patent and that said Letters Patent are hereby corrected as shown below:

Abstract - Column 2, line 3, change "addened" to -addend-.

Column 1, line 62, change "Aslo" to -Also-.

Column 2, line 17, change "Aslo" to -Also-.

Column 3, line 16, change "diaplay" to -display-.

Column 5, line 21, change "or" to -on-.

Column 5, line 33, change "added" to -adder-.

Column 7, lines 25-27, omit "Suitable . . . (FIG. 15)."

Column 8, line 22, change "Sexteenths" to -sixteenths-.

Column 9, line 47, change "146" to -via-.

UNITED STATES PATENT AND TRADEMARK OFFICE
CERTIFICATE OF CORRECTION

PATENT NO. : 4,100,603
DATED : July 11, 1978
INVENTOR(S) : John Oliver Boyd

It is certified that error appears in the above-identified patent and that said Letters Patent are hereby corrected as shown below:

Column 14, line 54, change "DATE" to -DATA-.

Column 17, line 12, change "preceeding" to -preceding-.

Column 18, line 24, change "outtput" to -output-.

Column 18, line 45, change "$E_0 - E_3)$" to -- $(E_0 - E_3)$ --.

Column 24, line 18, change "operating" to -operation-;
line 23, change "flip-flop" to -flip-flops-.

Column 24, line 24, change "to to" to -to two-.

Column 24, line 33, change "notice" to -noticed-.

Column 25, line 14, change "net" to -next-.

UNITED STATES PATENT AND TRADEMARK OFFICE
CERTIFICATE OF CORRECTION

PATENT NO. : 4,100,603
DATED : July 11, 1978
INVENTOR(S) : John Oliver Boyd

It is certified that error appears in the above-identified patent and that said Letters Patent are hereby corrected as shown below:

Column 25, line 58, change "Multiplication and Subtraction" to -Multiplication and Division-.

Column 27, line 28, change "ligh" to -light-.

Column 30, line 19, change "4" to -11-.

Column 30, line 62, change "10" to -13-.

Signed and Sealed this

First Day of May 1979

[SEAL]

Attest:

RUTH C. MASON
Attesting Officer

DONALD W. BANNER
Commissioner of Patents and Trademarks